United States Patent
Duan

(10) Patent No.: US 9,497,605 B2
(45) Date of Patent: Nov. 15, 2016

(54) SHORT MESSAGE PROCESSING METHOD AND RELEVANT SYSTEM

(71) Applicant: Huawei Device Co., Ltd., Shenzhen (CN)

(72) Inventor: Xiaoyan Duan, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 328 days.

(21) Appl. No.: 14/143,441

(22) Filed: Dec. 30, 2013

(65) Prior Publication Data

US 2014/0113668 A1    Apr. 24, 2014

Related U.S. Application Data

(63) Continuation of application No. PCT/CN2012/082562, filed on Oct. 8, 2012.

(30) Foreign Application Priority Data

Sep. 30, 2011    (CN) .......................... 2011 1 0296354

(51) Int. Cl.
    *H04W 4/14*    (2009.01)
    *H04L 12/58*   (2006.01)

(52) U.S. Cl.
    CPC ............... *H04W 4/14* (2013.01); *H04L 51/38* (2013.01)

(58) Field of Classification Search
    USPC ....................................................... 455/466
    See application file for complete search history.

(56) References Cited

U.S. PATENT DOCUMENTS 6,091,958 A  *  7/2000  Bergkvist .............. H04W 64/00
                                                    455/445
8,619,757 B2 * 12/2013  Shaheen ............. H04L 12/5835
                                                    370/352

(Continued)

FOREIGN PATENT DOCUMENTS

CN    101047630 A    10/2007
CN    101184258 A     5/2008

(Continued)

OTHER PUBLICATIONS

LG Electronics "Solution for SMS delivery between server and MSISDN-less IMS client," SA WG2 Meeting #86, S2-113318, Jul. 11-15, 2011, 7 pages.

(Continued)

*Primary Examiner* — Vladimir Magloire
*Assistant Examiner* — Frank Donado
(74) *Attorney, Agent, or Firm* — Conley Rose, P.C.

(57) ABSTRACT

A short message processing method and a relevant system. In one embodiment, a short message service (SMS)-submit message sent by a calling terminal to a mobile switching center (MSC) or service general packet radio service (GPRS) carries an indication that a called terminal does not have an MSISDN, and the SMS-submit message carries a session initiation protocol (SIP) uniform resource identifier (URI) of the called terminal, so that the calling terminal is capable of sending the indication and the SIP URI of the called terminal to an SMS-service center (SMS-SC) via the MSC or SGSN and an SMS-interworking MSC (SMS-IWMSC), and the SMS-SC implements short message communications with the called terminal via an SMS-GMSC and an Internet protocol (IP) short message-gateway (IP-SM-GW).

21 Claims, 12 Drawing Sheets

(56) References Cited

U.S. PATENT DOCUMENTS

| | | | |
|---|---|---|---|
| 8,781,442 B1* | 7/2014 | Link, II | G08G 1/205 370/338 |
| 2009/0131022 A1* | 5/2009 | Buckley | H04L 12/5895 455/412.1 |
| 2009/0221310 A1 | 9/2009 | Chen et al. | |
| 2010/0130239 A1* | 5/2010 | Shaw | H04L 51/14 455/466 |
| 2011/0080905 A1* | 4/2011 | Greene | H04L 51/066 370/352 |
| 2012/0322469 A1* | 12/2012 | Cai | H04L 51/38 455/466 |
| 2014/0155112 A1* | 6/2014 | Molnar | H04L 65/1016 455/466 |

FOREIGN PATENT DOCUMENTS

| | | |
|---|---|---|
| CN | 101202710 A | 6/2008 |
| CN | 101325740 A | 12/2008 |
| CN | 100579067 C | 1/2010 |
| WO | 2009012807 A1 | 1/2009 |

OTHER PUBLICATIONS

Foreign Communication From a Counterpart Application, Chinese Application No. 201110296354.1, Chinese Office Action dated Nov. 2, 2014, 6 pages.

Nokia Siemens Networks, et al, "SMS to an MSISDN-less IMS client—server to client communication," SA WG2 Meeting #86, S2-113728, Jul. 11-15, 2011, 7 pages.

Foreign Communication From a Counterpart Application, European Application No. 12836074.0, Extended European Search Report dated Jun. 25, 2015, 8 pages.

Partial English Translation and Abstract of Chinese Patent Application No. CN101047630A, Jul. 29, 2014, 62 pages.

Partial English Translation and Abstract of Chinese Patent Application No. CN100579067C, Jul. 30, 2014, 10 pages.

Foreign Communication From a Counterpart Application, PCT Application No. PCT/CN2012/082562, English Translation of International Search Report dated Jan. 17, 2013, 2 pages.

Foreign Communication From a Counterpart Application, PCT Application No. PCT/CN2012/082562, English Translation of Written Opinion dated Jan. 17, 2013, 14 pages.

"3rd Generation Partnership Projects; Technical Specification Group Services and Systems Aspects; Support of Short Message Service (SMS) in IMS Without MSISDN; Stage 2 (Release 11)," 3GPP TR 23.863, V0.1.0, Jul. 2011, 25 pages.

"3rd Generation Partnership Project; Technical Specification Group Services and Systems Aspects; IP Multimedia Subsystem (IMS); Stage 2 (Release 10)," 3GPP TS 23.228, V10.0.0, Mar. 2010, 267 pages.

"3rd Generation Partnership Project; Technical Specification Group Services and System Aspects; Service Level Interworking for Messaging Services; Stage 2 (Release 8)," 3GPP TR 23.811, V8.0.0, Mar. 2008, 36 pages.

\* cited by examiner

SHORT MESSAGE PROCESSING METHOD AND RELEVANT SYSTEM

CROSS-REFERENCE TO RELATED APPLICATIONS

This application is a continuation of international Application No. PCT/CN2012/082562, filed on Oct. 8, 2012, which claims priority to Chinese Patent Application No. 201110296354.1, filed on Sep. 30, 2011, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of communications technologies, and in particular, to a short message processing method and a relevant system.

BACKGROUND

Short message service (SMS) is a commonly used communications service nowadays. Different from a voice service, a short message service is to transport information such as text between a network and a user equipment (UE) through an SMS-service center (SMS-SC).

A conventional short message service depends on a Mobile Station International (MSI) Public Switched Telephone Network (PSTN)/Integrated Services Digital Network (ISDN) (MSISDN).

A short message may be sent between the calling terminal and the called terminal through a circuit switched (CS) domain or a packet switched (PS) domain or an Internet Protocol (IP) multimedia subsystem (IMS) network. With the appearance of new communications services and new terminals, although many new terminals (for example, machine type communications devices, devices with IMS subscription only) do not have an MSISDN, a short message is still required for communications.

When a short message is transferred in an IMS network, a called terminal is referred to as an IMS UE; when an existing calling terminal sends a short message to the IMS UE, the calling terminal first sends a short message service-submit message to a mobile switching center (MSC) or service general packet radio service (GPRS) support node (SGSN), the short message service-submit message is required to carry the MSISDN of the called terminal. Therefore, when the called terminal does not have an MSISDN, the called terminal cannot be identified, causing that a short message cannot be normally sent, that is, a terminal cannot send a short message to an IMS UE that does not have an MSISDN.

SUMMARY

Embodiments of the present invention provide a short message processing method and a relevant system, which are used to solve a problem that a calling terminal cannot send a short message to a called terminal that does not have an MSISDN, thereby implementing short message communications between a terminal and a terminal that does not have an MSISDN.

In one aspect, an embodiment of the present invention provides a short message processing method, including: sending, by a calling terminal, a short message service-submit message to an MSC or SGSN, where the short message service-submit message carries a session initiation protocol (SIP) uniform resource identifier (URI) of a called terminal and an indication that the called terminal does not have an MSISDN, the SIP URI is an IP Multimedia Subsystem Public User Identity (IMPU) of the called terminal, and the SMS-submit message is received by the MSC or SGSN and then sent to an SMS-interworking MSC(SMS-IWMSC), and sent by the SMS-IWMSC to an SMS-SC; sending, by the SMS-SC to an SMS-gateway MSC(SMS-GMSC), an SMS-deliver message and the indication that the called terminal does not have an MSISDN, where the SMS-deliver message carries the SIP URI of the called terminal, and sending, by the SMS-GMSC, the indication and a Forward Short Message to an IP-short message-gateway (IP-SM-GW), where the Forward Short Message carries the SIP URI of the called terminal; and acquiring, by the IP-SM-GW, the SIP URI of the called terminal from the Forward Short Message according to the indication, sending, by the IP-SM-GW, an SIP Message to the called terminal, and a request URI of the SIP Message is the SIP URI of the called terminal.

In another aspect, an embodiment of the present invention provides another short message processing method, including: sending, by a calling terminal, an SMS-submit message to an MSC or SGSN, where the SMS-submit message carries an MSISDN of a short message specific service server and an SIP URI of a called terminal, the SIP URI is an IMPU of the called terminal, and the SMS-submit message is received by the MSC or SGSN and then sent to an SMS-IWMSC, and sent by the SMS-IWMSC to an SMS-SC; sending, by the SMS-SC, an SMS-deliver message and the MSISDN to an SMS-GMSC, where the SMS-deliver message carries the SIP URI of the called terminal, and sending, by the SMS-GMSC, a Forward Short Message to the short message specific service server according to the MSISDN, where the Forward Short Message carries the SIP URI of the called terminal; and acquiring, by the short message specific service server, the SIP URI of the called terminal from the Forward Short Message, and sending, by the short message specific service server, an SIP Message to the called terminal, where a request URI of the SIP Message is the SIP URI of the called terminal.

In another aspect, an embodiment of the present invention provides another short message processing method, including: sending, by an calling terminal, an SMS-submit message to an MSC or SGSN, where the SMS-submit message carries an SIP URI of a called terminal, the SIP URI is an IMPU of the called terminal, and the SMS-submit message is received by the MSC or SGSN and then sent to an SMS-IWMSC, and sent by the SMS-IWMSC to an SMS-SC; the SMS-SC sends an SMS-deliver message to an SMS-GMSC, where the SMS-deliver message carries the SIP URI of the called terminal, and sending, by the SMS-GMSC, a Forward Short Message to an IP-SM-GW, where the Forward Short Message carries the SIP URI of the called terminal; and acquiring, by the IP-SM-GW, the SIP URI of the called terminal from the Forward Short Message, and sending, by the IP-SM-GW, an SIP Message to the called terminal, where a request URI of the SIP Message is the SIP URI of the called terminal.

In another aspect, an embodiment of the present invention provides another short message processing method, including: sending, by a calling terminal, an SMS-submit message to an MSC or SGSN, where the SMS-submit message carries an SIP URI of a called terminal and an indication that the called terminal does not have an MSISDN, and the SIP URI is an IMPU of the called terminal; acquiring, by the MSC or SGSN, according to the indication carried in the SMS-submit message, the SIP URI of the called terminal from the SMS-submit message, and converting the SMS-submit message into an SIP Message, where a request URI of the SIP Message is the SIP URI of the called terminal; and sending, by the MSC or SGSN, the SIP Message to the called terminal through a service call session control function entity (S-CSCF).

In another aspect, an embodiment of the present invention provides another short message processing method, including: sending, by a calling terminal, a short message to an inter-working function entity (IWF), where the short message carries a non-MSISDN identifier of a called terminal; mapping, by the IWF, the identifier of the called terminal as an international mobile subscriber identity (IMSI) of the called terminal, and sending an SMS-submit message to an SMS-SC, where the SMS-submit message carries the IMSI of the called terminal; sending, by the SMS-SC, an SMS-deliver message to an SMS-GMSC, where the SMS-deliver message carries the IMSI of the called terminal, and sending, by the SMS-GMSC, a Forward Short Message to an IP-SM-GW; and sending, by the IP-SM-GW, an SIP Message to the called terminal, where a request URI of the SIP Message is an SIP URI of the called terminal, and the SIP URI of the called terminal is obtained by the IP-SM-GW through mapping according to the IMSI of the called terminal, or the SIP URI of the called terminal is obtained by a home location register (HLR) or home subscriber service (HSS) through mapping according to the IMSI of the called terminal and sent to the IP-SM-GW.

In one aspect, an embodiment of the present invention provides a short message processing system, which includes a calling terminal, an MSC or SGSN, an SMS-IWMSC, an SMS-SC, an SMS-GMSC, an IP-SM-GW, and a called terminal, where: the calling terminal is configured to send an SMS-submit message to the MSC or SGSN, where the SMS-submit message carries an SIP URI of the called terminal and an indication that the called terminal does not have an MSISDN, and the SIP URI is an IMPU of the called terminal; the MSC or SGSN is configured to receive the SMS-submit message sent by the calling terminal, and send the SMS-submit message to the SMS-IWMSC; the SMS-IWMSC is configured to receive the SMS-submit message sent by the MSC or SGSN, and forward the SMS-submit message to the SMS-SC; the SMS-SC is configured to receive the SMS-submit message forwarded by the SMS-IWMSC, and send an SMS-deliver message and the indication to the SMS-GMSC, where the SMS-deliver message carries the SIP URI of the called terminal; the SMS-GMSC is configured to receive the SMS-deliver message and the indication that are sent by the SMS-SC, and send the indication and a Forward Short Message to the IP-SM-GW, where the Forward Short Message carries the SIP URI of the called terminal; the IP-SM-GW is configured to acquire the SIP URI of the called terminal from the Forward Short Message according to the indication, and send an SIP Message to the called terminal, where a request URI of the SIP Message is the SIP URI of the called terminal; and the called terminal is configured to receive the SIP Message sent by the IP-SM-GW.

In another aspect, an embodiment of the present invention provides a short message processing system, which includes a calling terminal, an MSC or SGSN, a SMS-IWMSC, an SMS-SC, an SMS-GMSC, a short message specific service server, and a called terminal, where: the calling terminal is configured to send an SMS-submit message to the MSC or SGSN, where the SMS-submit message carries an MSISDN of the short message specific service server and an SIP URI of the called terminal, and the SIP URI is an IMPU of the called terminal; the MSC or SGSN is configured to receive the SMS-submit message sent by the calling terminal, and forward the SMS-submit message to the SMS-IWMSC; the SMS-IWMSC is configured to receive the SMS-submit message sent by the MSC or SGSN, and forward the SMS-submit message to the SMS-SC; the SMS-SC is configured to receive the SMS-submit message forwarded by the SMS-IWMSC, and send an SMS-deliver message and the MSISDN of the short message specific service server to the SMS-GMSC, where the SMS-deliver message carries the SIP URI of the called terminal; the SMS-GMSC is configured to receive the SMS-deliver message and the MSISDN of the short message specific service server that are sent by the SMS-SC, and send a Forward Short Message to the short message specific service server, where the Forward Short Message carries the SIP URI of the called terminal; the short message specific service server is configured to receive the Forward Short Message sent by the SMS-GMSC, acquire the SIP URI of the called terminal from the Forward Short Message, and send an SIP Message to the called terminal, where a request URI of the SIP Message is the SIP URI of the called terminal; and the called terminal is configured to receive the SIP Message sent by the short message specific service server.

In one aspect, an embodiment of the present invention provides a short message processing system, which includes a calling terminal, an MSC or SGSN, an SMS-IWMSC, an SMS-SC, an SMS-GMSC, an HLR or HSS, an IP-SM-GW, and a called terminal, where: the calling terminal is configured to send an SMS-submit message to the MSC or SGSN, where the SMS-submit message carries an SIP URI of the called terminal, and the SIP URI is an IMPU of the called terminal; the MSC or SGSN is configured to receive the SMS-submit message sent by the calling terminal, and forward the SMS-submit message to the SMS-IWMSC; the SMS-IWMSC is configured to receive the SMS-submit message sent by the MSC or SGSN, and forward the SMS-submit message to the SMS-SC; the SMS-SC is configured to receive the SMS-submit message forwarded by the SMS-IWMSC, and send an SMS-deliver message to the SMS-GMSC, where the SMS-deliver message carries the SIP URI of the called terminal; the SMS-GMSC is configured to receive the SMS-deliver message sent by the SMS-SC, and send a Forward Short Message to the IP-SM-GW, where the Forward Short Message carries the SIP URI of the called terminal; the IP-SM-GW is configured to acquire the SIP URI of the called terminal from the Forward Short Message, and send an SIP Message to the called terminal, where a request URI of the SIP Message is the SIP URI of the called terminal; and the called terminal is configured to receive the SIP Message sent by the IP-SM-GW.

In another aspect, an embodiment of the present invention provides a short message processing system, which includes a calling terminal, an MSC or SGSN, an S-CSCF, and a called terminal, where: the calling terminal is configured to send an SMS-submit message to the MSC or SGSN, where the SMS-submit message carries an indication that the called terminal does not have an MSISDN, the SMS-submit message carries an SIP URI of the called terminal, and the SIP URI is an IMPU of the called terminal; the MSC or SGSN is configured to receive the SMS-submit message sent by the calling terminal, acquire the SIP URI of the called terminal from the SMS-submit message according to the indication carried in the SMS-submit message, and convert the SMS-submit message into an SIP Message, where a request URI of the SIP Message is the SIP URI of the called terminal; and send the SIP Message to the S-CSCF; the S-CSCF is configured to receive the SIP Message sent by the MSC or SGSN, and forward the SIP Message to the called terminal; and the called terminal is configured to receive the SIP Message forwarded by the S-CSCF.

In another aspect, an embodiment of the present invention provides a short message processing system, which includes a calling terminal, an IWF, an SMS-SC, a SMS-GMSC, an HLR or HSS, an IP-SM-GW, and a called terminal, where: the calling terminal is configured to send a short message to the IWF, where the short message carries a non-MSISDN identifier of the called terminal; the IWF is configured to receive the short message sent by the calling terminal, map the identifier of the called terminal as an IMSI of the called terminal, and send an SMS-submit message to the SMS-SC, where the SMS-submit message carries the IMSI of the called terminal; the SMS-SC is configured to receive the SMS-submit message sent by the IWF, and send an SMS-deliver message to the SMS-GMSC, where the SMS-deliver message carries the IMSI of the called terminal; the SMS-GMSC is configured to receive the SMS-deliver message, and send a Forward Short Message to the IP-SM-GW; the IP-SM-GW is configured to send an SIP Message to the called terminal, where a request URI of the SIP Message is an SIP URI of the called terminal, the SIP URI of the called terminal is obtained by the IP-SM-GW through mapping according to the IMSI of the called terminal, or the SIP URI of the called terminal is obtained by the HLR or HSS through mapping according to the IMSI of the called terminal and sent to the IP-SM-GW; and the called terminal is configured to receive the SIP Message sent by the IP-SM-GW.

As can be seen from the foregoing technical solutions, the embodiments of the present invention have the following advantages:

In one embodiment provided by the present invention, an SMS-submit message sent by a calling terminal to an MSC or SGSN carries an indication that a called terminal does not have an MSISDN, and the SMS-submit message carries an SIP URI of the called terminal, so that the calling terminal is capable of sending the indication and the SIP URI of the called terminal to an SMS-SC via the MSC or SGSN and an SMS-IWMSC, and the SMS-SC implements short message communications with the called terminal via an SMS-GMSC and an IP-SM-GW, thereby solving the problem that a calling terminal cannot send a short message to a called terminal that does not have an MSISDN, and implementing short message communications between a terminal and a terminal that does not have an MSISDN.

In another embodiment provided by the present invention, an SMS-submit message sent by a calling terminal to an MSC or SGSN carries an MSISDN of a short message specific service server, and the SMS-submit message carries an SIP URI of a called terminal, so that the calling terminal is capable of sending the MSISDN of the short message specific service server and the SIP URI of the called terminal to an SMS-SC via the MSC or SGSN and an SMS-IWMSC, and the SMS-SC implements short message communications with the called terminal via an SMS-GMSC and the short message specific service server, thereby solving the problem that a calling terminal cannot send a short message to a called terminal that does not have an MSISDN, and implementing short message communications between a terminal and a terminal that does not have an MSISDN.

In another embodiment provided by the present invention, an SMS-submit message sent by a calling terminal to an MSC or SGSN carries an SIP URI of a called terminal, so that the calling terminal is capable of sending the SIP URI of the called terminal to an SMS-SC via the MSC or SGSN and an SMS-IWMSC, and the SMS-SC implements short message communications with the called terminal via an SMS-GMSC and an IP-SM-GW, thereby solving the problem that a calling terminal cannot send a short message to a called terminal that does not have an MSISDN, and implementing short message communications between a terminal and a terminal that does not have an MSISDN.

In another embodiment provided by the present invention, an SMS-submit message sent by a calling terminal to an MSC or SGSN carries an indication that a called terminal does not have an MSISDN, and the SMS-submit message carries an SIP URI of the called terminal, so that the calling terminal is capable of sending the indication and the SIP URI of the called terminal to an S-CSCF via the MSC or SGSN, and the S-CSCF implements short message communications with the called terminal, thereby solving the problem that a calling terminal cannot send a short message to a called terminal that does not have an MSISDN, and implementing short message communications between a terminal and a terminal that does not have an MSISDN.

In another embodiment provided by the present invention, a short message sent by a calling terminal to an IWF carries a non-MSISDN identifier of a called terminal, the IWF is capable of mapping the identifier of the called terminal as an IMSI of the called terminal and sending the IMSI of the called terminal to an SMS-SC, and the SMS-SC implements short message communications with the called terminal via an SMS-GMSC and an IP-SM-GW, thereby solving the problem that a calling terminal cannot send a short message to a called terminal that does not have an MSISDN, and implementing short message communications between a terminal and a terminal that does not have an MSISDN.

BRIEF DESCRIPTION OF DRAWINGS

To illustrate the technical solutions according to the embodiments of the present invention more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DESCRIPTION OF EMBODIMENTS

Figure 1:
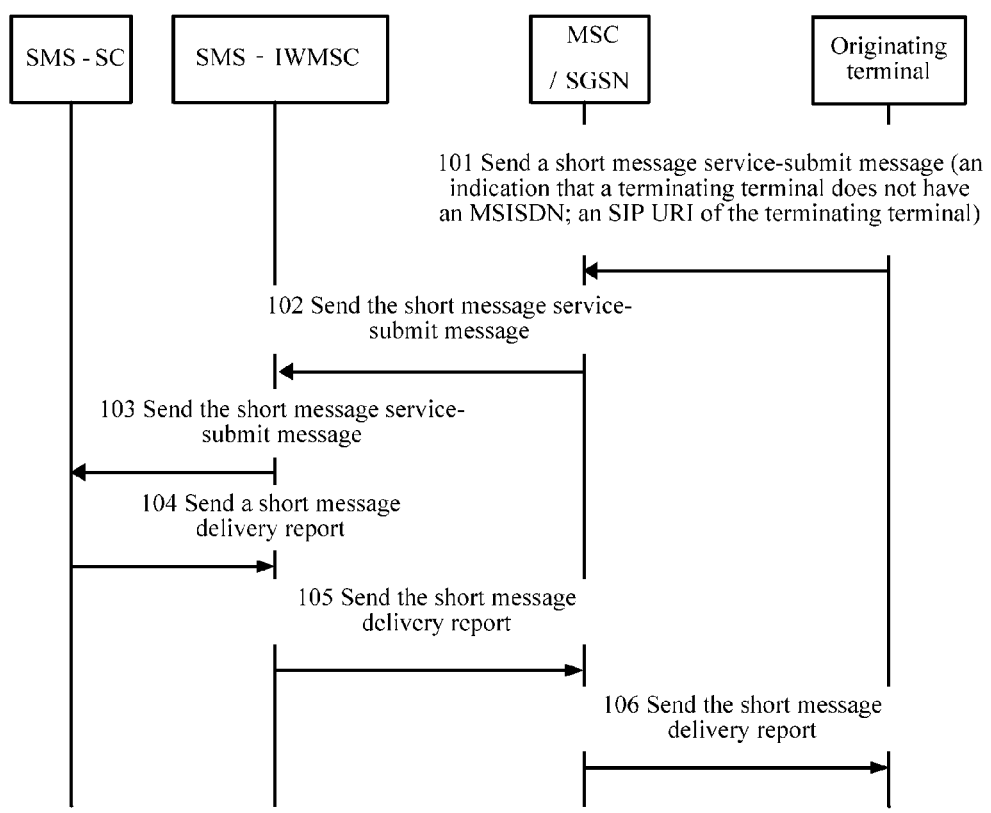
FIG. 1 is a schematic diagram of an embodiment of a short message sending method according to an embodiment of the present invention.

Embodiments of the present invention provide a short message processing method and a relevant system, which are used to solve a problem that a calling terminal cannot send a short message to a called terminal that does not have an MSISDN, thereby implementing short message communications between a terminal and a terminal that does not have an MSISDN.

To make the inventive objectives, features and advantages of the present invention more comprehensible, the technical solutions in the embodiments of the present invention are clearly and completely described in the following with reference to the accompanying drawings in the embodiments of the present invention. It is obvious that the embodiments to be described are only a part rather than all of the embodiments of the present invention. All other embodiments obtained by persons skilled in the art according to the embodiments of the present invention without creative efforts shall fall within the protection scope of the present invention.

A short message processing method provided in the embodiments of the present invention, which includes two processes: a short message sending method and a short message receiving method, where the short message sending method refers to a process of transferring a short message from a calling terminal to an SMS-service center, the short message receiving method refers to a process of transferring a short message from an SMS-service center to a called terminal, and in the following the short message sending method and the short message receiving method are introduced separately. The short message sending method shown in FIG. 1 and the short message receiving method shown in FIG. 2 together form one embodiment of a short message processing method provided in an embodiment of the present invention, the short message sending method shown in FIG. 3 and the short message receiving method shown in FIG. 4 together form another embodiment of a short message processing method provided in an embodiment of the present invention, and the short message sending method shown in FIG. 5 and the short message receiving method shown in FIG. 6 together form another embodiment of a short message processing method provided in an embodiment of the present invention.

An embodiment of the present invention provides a short message processing method, including: sending, by a calling terminal, an SMS-submit message to an MSC or SGSN, where the SMS-submit message carries an indication that a called terminal does not have an MSISDN, the SMS-submit message carries an SIP URI of the called terminal, the SIP URI is an IMPU of the called terminal, and the SMS-submit message is received by the MSC or SGSN and then sent to an SMS-IWMSC, and sent by the SMS-IWMSC to an SMS-SC; sending, by the SMS-SC to an SMS-GMSC, an SMS-deliver message and the indication that the called terminal does not have an MSISDN, where the SMS-deliver message carries the SIP URI of the called terminal, and after the SMS-deliver message and the indication are received by the SMS-GMSC, sending, by the SMS-GMSC, the indication and a Forward Short Message to an IP-SM-GW, where the Forward Short Message carries the SIP URI of the called terminal; and acquiring, by the IP-SM-GW, the SIP URI of the called terminal from the Forward Short Message according to the indication, and sending, by the IP-SM-GW, an SIP Message to the called terminal, where a request uniform resource identifier of the SIP Message is the SIP URI of the called terminal.

In the embodiment provided by the present invention, an SMS-submit message sent by a calling terminal to an MSC or SGSN carries an indication that a called terminal does not have an MSISDN, and the SMS-submit message carries an SIP URI of the called terminal, so that the calling terminal is capable of sending the indication and the SIP URI of the called terminal to an SMS-SC via the MSC or SGSN and an SMS-IWMSC, and the SMS-SC implements short message communications with the called terminal via an SMS-GMSC and an IP-SM-GW, thereby solving the problem that a calling terminal cannot send a short message to a called terminal that does not have an MSISDN, and implementing short message communications between a terminal and a terminal that does not have an MSISDN.

Figure 2:
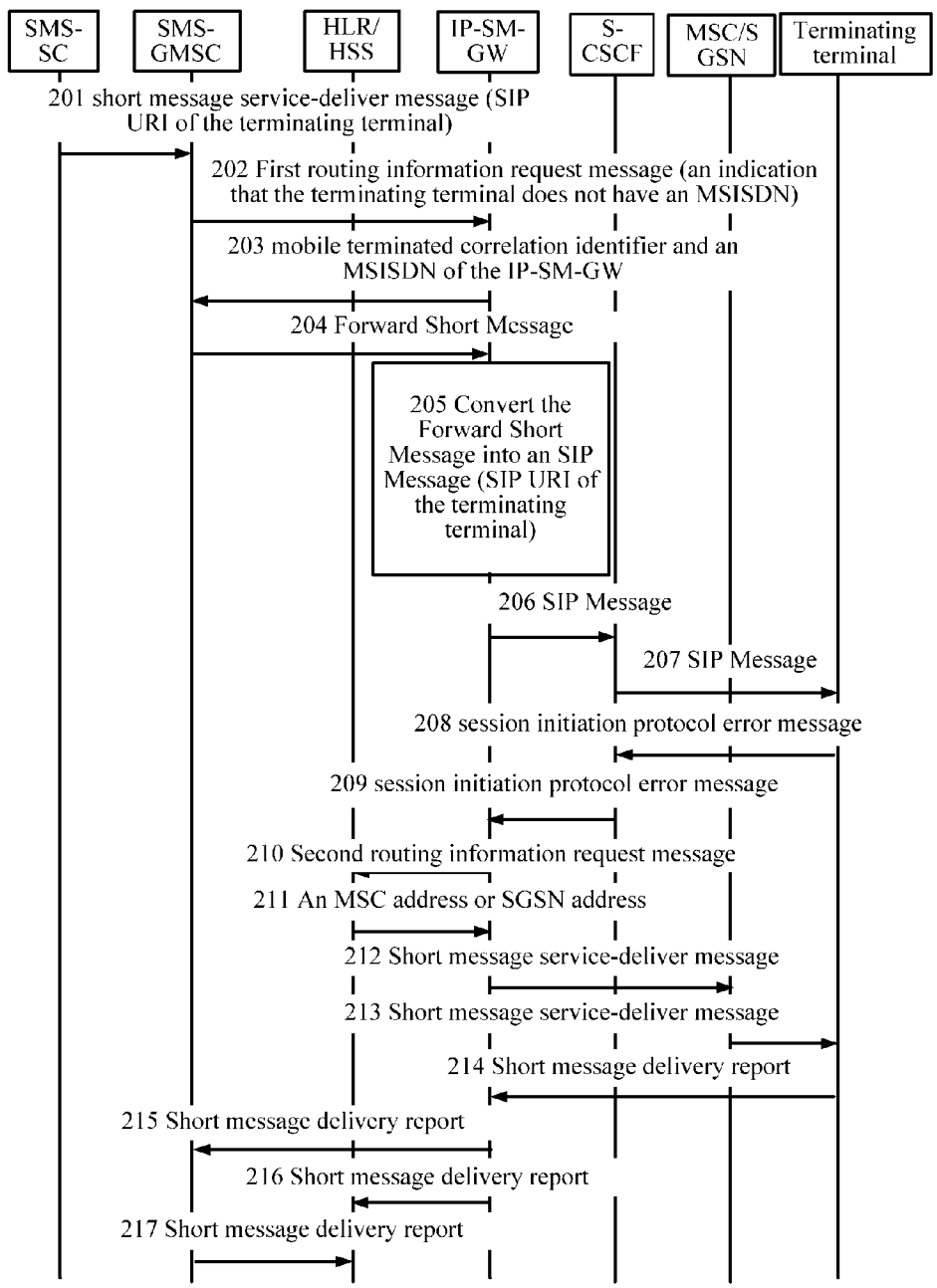
FIG. 2 is a schematic diagram of another embodiment of a short message receiving method according to an embodiment of the present invention.

To illustrate the foregoing embodiment in detail, please refer to the short message sending method in FIG. 1 and the short message receiving method shown in FIG. 2. An embodiment of the present invention provides a short message sending method, which, as shown in FIG. 1, includes:

Step 101. A calling terminal sends an SMS-submit message to an MSC or SGSN.

The SMS-submit message carries an indication that a called terminal does not have an MSISDN, the SMS-submit message carries an SIP URI of the called terminal, and the SIP URI is an IMPU of the called terminal.

In the embodiment of the present invention, the calling terminal sends the SMS-submit message to the MSC or SGSN, where the SMS-submit message carries the indication that the called terminal does not have an MSISDN, the SMS-submit message carries the SIP URI of the called terminal, and the SIP URI is the IMPU of the called terminal. In practical applications, the SMS-submit message carries the SIP URI of the called terminal, for example, the IMPU of the called terminal carried in the SMS-submit message is SIP:UE2@network2.com.

It should be noted that, that the calling terminal sends the SMS-submit message to the MSC or SGSN in step 101 may specifically include: sending, by the calling terminal, the SMS-submit message to the MSC, or, sending, by the calling terminal, the SMS-submit message to the SGSN. When the calling terminal adopts a CS domain, the SMS-submit message is sent to the MSC, and the calling terminal, and when the calling terminal adopts a PS domain, the SMS-submit message is sent to the SGSN. Specifically, the calling terminal selects either the MSC or the SGSN to send the message.

It should be noted that, in practical applications, as for that the SMS-submit message carries the indication that the called terminal does not have an MSISDN, one implementable manner is that, a transfer layer protocol-destination-address (TP-DA) field of the SMS-submit message carries the indication that the called terminal does not have an MSISDN, and a specific value may be taken as the field value of the field to indicate that the SMS-submit message carries the indication that the called terminal does not have an MSISDN.

As for that the SMS-submit message carries the indication that the called terminal does not have an MSISDN, another implementable manner is that a transfer layer protocol-protocol identifier (TP-PID) field of the SMS-submit message carries the indication that the called terminal does not have an MSISDN, and a specific value may be taken as the field value of the field to indicate that the SMS-submit message carries the indication that the called terminal does not have an MSISDN.

As for that the SMS-submit message carries the indication that the called terminal does not have an MSISDN, another implementable manner is that a preset newly-defined field in the SMS-submit message carries the indication that the called terminal does not have an MSISDN. For example, a preset newly-defined field is a transfer layer protocol-destination-MSISDN-indication (TP-DMI), and a specific value may be taken as the field value of the field to indicate that the SMS-submit message carries the indication that the called terminal does not have an MSISDN.

It should be noted that, in practical applications, as for that the SMS-submit message carries the SIP URI of the called terminal, one implementable manner is that, a transfer layer protocol (TP) User Data field header of the SMS-submit message carries the SIP URI of the called terminal. For example, a destination address element may be newly defined for the TP User Data field header to carry the SIP URI of the called terminal.

In practical applications, as for that the SMS-submit message carries the SIP URI of the called terminal, another implementable manner is that a TP User Data field short message of the SMS-submit message carries the SIP URI of the called terminal.

It should be noted that, in practical applications, as for that the calling terminal sends the SMS-submit message to the MSC or SGSN, one implementable manner is that the calling terminal encapsulates the SMS-submit message in the relay layer protocol-mobile originated-data (RP-MO-DATA) message, and sends the RP-MO-DATA message to the MSC or SGSN.

It should be noted that, in the embodiment of the present invention, before the calling terminal sends the SMS-submit message to the MSC or SGSN, the calling terminal has already sent out an access request to a visitor location register (VLR), where an authentication process may be included. That the calling terminal sends out the access request and the authentication process belong to the prior art and are not described in detail herein.

Step 102. The MSC or SGSN sends the SMS-submit message to an SMS-IWMSC.

The SMS-submit message carries the indication that the called terminal does not have an MSISDN, and the SMS-submit message carries the SIP URI of the called terminal.

In the embodiment of the present invention, the meaning of that the MSC or SGSN sends the SMS-submit message to the SMS-IWMSC, is that: if in step 101, the calling terminal sends the SMS-submit message to the MSC, at this time, the MSC sends the SMS-submit message to the SMS-IWMSC, and if in step 101, the calling terminal sends the SMS-submit message to the SGSN, at this time, the SGSN sends the SMS-submit message to the SMS-IWMSC.

It should be noted that, in the embodiment of the present invention, before step 102, a step may be further included, in which the MSC or SGSN verifies, with the VLR, whether a short message is allowed to be sent, so as to avoid a conflict with a carrier policy, supplementary service or the like.

103. The SMS-IWMSC sends the SMS-submit message to the SMS-SC.

In the embodiment of the present invention, after the SMS-IWMSC receives the SMS-submit message from the MSC or SGSN, the SMS-IWMSC sends the SMS-submit message to the SMS-SC SMS, so that the SMS-SC is capable of sending the SMS-submit message to the called terminal, thereby implementing short message communications between the calling terminal and the called terminal.

It should be noted that, in the embodiment of the present invention, after the SMS-IWMSC forwards the SMS-submit message to the SMS-SC, the following steps may be further included:

Step 104. The SMS-SC sends a short message delivery report to the SMS-IWMSC.

Step 105. The SMS-IWMSC sends the short message delivery report to the MSC or SGSN.

Step 106. The MSC or SGSN sends the short message delivery report to the calling terminal.

In the embodiment provided by the present invention, an SMS-submit message sent by a calling terminal to an MSC or SGSN carries an indication that a called terminal does not have an MSISDN, the SMS-submit message carries an IMPU of the called terminal in the form of an SIP URI, so that the calling terminal is capable of sending the indication and the SIP URI of the called terminal to an SMS-SC via an MSC or SGSN and an SMS-IWMSC, and the SMS-SC implements short message communications with the called terminal via an SMS-GMSC, HLR or HSS, IP-SM-GW, and S-CSCF, thereby solving the problem that the calling terminal cannot send a short message to the called terminal that does not have an MSISDN, and implementing short message communications between a terminal and a terminal that does not have an MSISDN.

In the embodiment shown in FIG. 1, a short message sending method is introduced, where a short message sending process is described. In the following, a short message receiving method corresponding to the embodiment of FIG. 1 to implement short message receiving processing is introduced. Referring to FIG. 2, an embodiment of the present invention provides a short message receiving method, including:

Step 201. An SMS-SC sends, to an SMS-GMSC, a, SMS-deliver message and an indication that a called terminal does not have an MSISDN.

The SMS-deliver message carries an SIP URI of the called terminal.

In the embodiment of the present invention, after the SMS-SC receives, from a calling terminal, an SMS-submit message sent by the calling terminal, the SMS-SC sends, to the SMS-GMSC, the SMS-deliver message and the indication that the called terminal does not have an MSISDN, and the SMS-deliver message carries the SIP URI of the called terminal.

It should be noted that, in the embodiment of the present invention, the called terminal is also referred to as an IMS UE, and before the SMS-SC sends the SMS-deliver message to the SMS-GMSC, an IMS registration or re-registration process has been completed, an S-CSCF forwards registration information of the IMS UE to an IP-SM-GW, the IP-SM-GW further sends the registration information of the IMS UE and an address of the IP-SM-GW to an HLR/HSS. Only after the called terminal has completed the IMS registration or re-registration, the IP-SM-GW is capable of using an IMS network to send a short message to the called terminal.

It should be noted that, in practical applications, as for that the SMS-SC sends, to the SMS-GMSC, the SMS-deliver message and the indication that the called terminal does not have an MSISDN, one implementable manner is that, the SMS-deliver message is encapsulated in a relay layer protocol-mobile terminated-data (RP-MT-DATA) message, and a relay layer protocol-destination-address (RP-DA) field of the RP-MT-DATA carries the indication that the called terminal does not have an MSISDN.

It should be noted that, in practical applications, as for the indication that the called terminal does not have an MSISDN, another implementable manner is that a preset newly-defined field in the RP-MT-DATA message carries the indication that the called terminal does not have an MSISDN; for example, the preset newly-defined field is a relay layer protocol-destination-MSISDN-indication (RP-DMI), and a specific value may be taken as the field value of the field to indicate the indication that the called terminal does not have an MSISDN.

It should be noted that, in practical applications, as for that the SMS-deliver message carries the SIP URI of the called terminal, one implementable manner is that, a TP User Data field header of the SMS-deliver message carries the SIP URI of the called terminal. For example, the SIP URI of the called terminal is contained in the TP User Data field header, so that a destination address element may be newly defined for the TP User Data field header to carry the SIP URI of the called terminal.

In practical applications, as for that the SMS-deliver message carries the SIP URI of the called terminal, another implementable manner is that a TP User Data short message of the SMS-deliver message carries the SIP URI of the called terminal.

It should be noted that, in practical applications, as for that the SMS-SC sends the SMS-deliver message to the SMS-GMSC, one implementable manner is that, the SMS-SC encapsulates the SMS-deliver message in an RP-MT-DATA message, and sends the RP-MT-DATA message to the SMS-GMSC.

Step 202. The SMS-GMSC sends a first routing information request message to the HLR or HSS, and the HLR or HSS forwards the first routing information request message to the IP-SM-GW.

The first routing information request message carries the indication that the called terminal does not have an MSISDN.

In the embodiment of the present invention, after receiving the SMS-deliver message sent by the SMS-SC, the SMS-GMSC sends the first routing information request message to the HLR or HSS according to the SMS-deliver message, and the HLR or HSS forwards the first routing information request message to the IP-SM-GW. It should be noted that, in the embodiment of the present invention, the meaning of that the SMS-GMSC sends the first routing information request message to the HLR or HSS is that: the SMS-GMSC sends the first routing information request message to the HLR, or the SMS-GMSC sends the first routing information request message to the HSS. The meaning of that the HLR or HSS forwards the first routing information request message to the IP-SM-GW is that: when the SMS-GMSC sends the first routing information request message to the HLR, the HLR forwards the first routing information request message to the IP-SM-GW, and when the SMS-GMSC sends the first routing information request message to the HSS, the HSS forwards the first routing information request message to the IP-SM-GW.

It should be noted that, in practical applications, as for that the first routing information request message carries the indication that the called terminal does not have an MSISDN, one implementable manner is that, an MSISDN field of the first routing information request message carries the indication that the called terminal does not have an MSISDN.

In practical applications, as for that the first routing information request message carries the indication that the called terminal does not have an MSISDN, another implementable manner is that a preset newly-defined field in the first routing information request message carries the indication that the called terminal does not have an MSISDN; for example, the preset newly-defined field is a destination MSISDN indication, and the destination MSISDN indication field carries the indication that the called terminal does not have an MSISDN.

It should be noted that, the first routing information request message described in step 202 in the embodiment of the present invention is a type of routing request information, and in addition, a second routing information request message described in subsequent step 210 is also a type of routing request information, and the name first routing information request message taken in step 202 is for distinction from the second routing information request message in subsequent step 210, where "first" and "second" are not related in a time sequence or logically: when a first routing information request message appears, a second routing information request message is not necessarily required to appear, and definitely, when a second routing information request message appears, a first routing information request message is neither necessarily required to appear, and "first" and "second" are only for indicating that two routing information request messages are different. Definitely, to distinguish the routing information request messages that appear in step 202 and step 210, other names may be adopted as long as it is indicated that the routing information request messages are two different messages, for example, the names may be a routing information request message a and a routing information request message b, and so on.

Step 203. The IP-SM-GW generates a called correlation identifier, and returns a called correlation identifier and an MSISDN of the IP-SM-GW to the SMS-GMSC.

The called correlation identifier (MT Correlation ID) is used for correlating a Forward Short Message subsequently sent by the SMS-GMSC and the first routing information request message.

Step 204. The SMS-GMSC sends the Forward Short Message to the IP-SM-GW.

The Forward Short Message carries the indication that the called terminal does not have an MSISDN, the Forward Short Message carries the SIP URI of the called terminal, and the Forward Short Message carries the called correlation identifier.

In the embodiment of the present invention, after the SMS-GMSC receives the called correlation identifier and the MSISDN of the IP-SM-GW, the SMS-GMSC sends the Forward Short Message to the IP-SM-GW according to the MSISDN of the IP-SM-GW.

Step 205. According to the indication carried in the Forward Short Message, the IP-SM-GW acquires the SIP URI of the called terminal from the Forward Short Message, and converts the Forward Short Message into an SIP Message.

A request URI of the SIP Message is the SIP URI of the called terminal.

In the embodiment of the present invention, the IP-SM-GW is capable of obtaining, according to the indication carried in the Forward Short Message, that the called terminal does not have an MSISDN, the IP-SM-GW acquires the SIP URI of the called terminal from the Forward Short Message, and converts the Forward Short Message into the SIP Message, the Request URI of the SIP Message is the SIP URI of the called terminal, a message body of the SIP Message carries information content or short message content of the Forward Short Message.

It should be noted that, in practical applications, as for that the IP-SM-GW acquires the SIP URI of the called terminal from the Forward Short Message, one implementable manner is that, the IP-SM-GW acquires the SIP URI of the called terminal from a transfer layer protocol user data field header or transfer layer protocol user data field short message of the Forward Short Message.

Step 206. The IP-SM-GW sends the SIP Message to the S-CSCF.

In the embodiment of the present invention, after the IP-SM-GW converts the Forward Short Message into the SIP Message, the IP-SM-GW sends the SIP Message to the S-CSCF.

Step 207. The S-CSCF forwards the SIP Message to the called terminal.

In the embodiment of the present invention, after receiving the SIP Message from the IP-SM-GW, the S-CSCF forwards the SIP Message to the called terminal, so that the called terminal is capable of receiving the SIP Message, thereby implementing short message communications between the calling terminal and the called terminal.

It should be noted that, in the embodiment of the present invention, after the S-CSCF forwards the SIP Message to the called terminal in step 207, the following steps may further be included:

Step 208. If the called terminal fails to receive the SIP Message, the called terminal sends an SIP Error message to the S-CSCF.

Step 209. The S-CSCF forwards the session initiation protocol error message to the IP-SM-GW.

Step 210. The IP-SM-GW sends a second routing information request message to the HLR or HSS, where the second routing information request message carries the SIP URI or an IMSI of the called terminal.

Step 211. The HLR or HSS returns an MSC address or SGSN address to the IP-SM-GW according to the SIP URI or IMSI of the called terminal.

Step 212. The IP-SM-GW sends an SMS-deliver message to the MSC or SGSN.

In the embodiment of the present invention, the meaning of that the IP-SM-GW sends the SMS-deliver message to the MSC or SGSN is that: when the IP-SM-GW adopts a CS domain, the SMS-deliver message is sent to the MSC, and when the IP-SM-GW adopts a PS domain, the SMS-deliver message is sent to the SGSN. Specifically, the IP-SM-GW selects either the MSC or the SGSN to send the message.

Step 213. The MSC or SGSN forwards the SMS-deliver message to the called terminal.

In the embodiment of the present invention, the meaning of that the MSC or SGSN forwards the SMS-deliver message to the called terminal is that: when the IP-SM-GW adopts the CS domain, the MSC forwards the SMS-deliver message to the called terminal, and when the IP-SM-GW adopts the PS domain, the SGSN forwards the SMS-deliver message to the called terminal.

It should be noted that, after the MSC or SGSN forwards the SMS-deliver message to the called terminal in step 213, the following steps may be further included:

Step 214. The called terminal sends a short message delivery report to the IP-SM-GW through the MSC or SGSN to indicate that the called terminal has successfully received the short message.

Step 215. The IP-SM-GW forwards the short message delivery report to the SMS-GMSC.

Step 216. The IP-SM-GW sends a short message delivery status report to the HLR/HSS to indicate that the called terminal has successfully received the short message.

Step 217. The SMS-GMSC sends a short message delivery status report to the HLR/HSS, and the HLR/HSS neglects the short message delivery status report.

In the embodiment of the present invention, if the called terminal has successfully received the SIP Message, the embodiment of the present invention may further include the following method: the called terminal sends an SIP 200 OK message to the S-CSCF, and the S-CSCF forwards the SIP 200 OK message to the IP-SM-GW.

It should be noted that, after the S-CSCF forwards the SIP 200 OK message to the IP-SM-GW, the following may be further included: the called terminal sends a short message delivery report to the IP-SM-GW through the S-CSCF to indicate that the called terminal has successfully received the short message.

The IP-SM-GW replies with an accept message to the UE through the S-CSCF.

The IP-SM-GW sends a short message delivery report to the SMS-GMSC.

The IP-SM-GW sends a short message delivery status report to the HSS/HLR to indicate that the UE has successfully received the short message.

The SMS-GMSC sends a short message delivery status report to the HSS/HLR, and the HSS/HLR neglects the short message delivery status report.

In the embodiment provided by the present invention, an SMS-SC sends, to an SMS-GMSC, an SMS-deliver message and an indication that a called terminal does not have an MSISDN, and the SMS-deliver message carries an SIP URI of the called terminal, so that the SMS-SC implements short message communications with the called terminal via the SMS-GMSC, an HLR or HSS, an IP-SM-GW, and an S-CSCF, thereby solving the problem that a calling terminal cannot send a short message to the called terminal that does not have an MSISDN, and implementing short message communications between a terminal and a terminal that does not have an MSISDN.

Another embodiment of the present invention provides a short message processing method, which is introduced in the following, and includes: sending, by a calling terminal, an SMS-submit message to an MSC or SGSN, where the SMS-submit message carries an MSISDN of a short message specific service server, the SMS-submit message carries an SIP URI of the called terminal, the SIP URI is an IMPU of the called terminal, the SMS-submit message is received by the MSC or SGSN and then sent to an SMS-IWMSC, and sent by the SMS-IWMSC to an SMS-SC; sending, by the SMS-SC, an SMS-deliver message and the MSISDN of the short message specific service server to an SMS-GMSC, where the SMS-deliver message carries the SIP URI of the called terminal, and after the SMS-deliver message and the MSISDN of the short message specific service server are received by the SMS-GMSC, sending, by the SMS-GMSC, a Forward Short Message to the short message specific service server, where the Forward Short Message carries the SIP URI of the called terminal; and acquiring, by the short message specific service server, the SIP URI of the called terminal from the Forward Short Message, and sending, by the short message specific service server, an SIP Message to the called terminal, where a request uniform resource identifier of the SIP Message is the SIP URI of the called terminal.

In another embodiment provided by the present invention, an SMS-submit message sent by a calling terminal to an MSC or SGSN carries an MSISDN of a short message specific service server, and the SMS-submit message carries an SIP URI of a called terminal, so that the calling terminal is capable of sending the MSISDN of the short message specific service server and the SIP URI of the called terminal to an SMS-SC via the MSC or SGSN and an SMS-IWMSC, and the SMS-SC implements short message communications with the called terminal via an SMS-GMSC and the short message specific service server, thereby solving the problem that a calling terminal cannot send a short message to a called terminal that does not have an MSISDN, and implementing short message communications between a terminal and a terminal that does not have an MSISDN.

Figure 3:
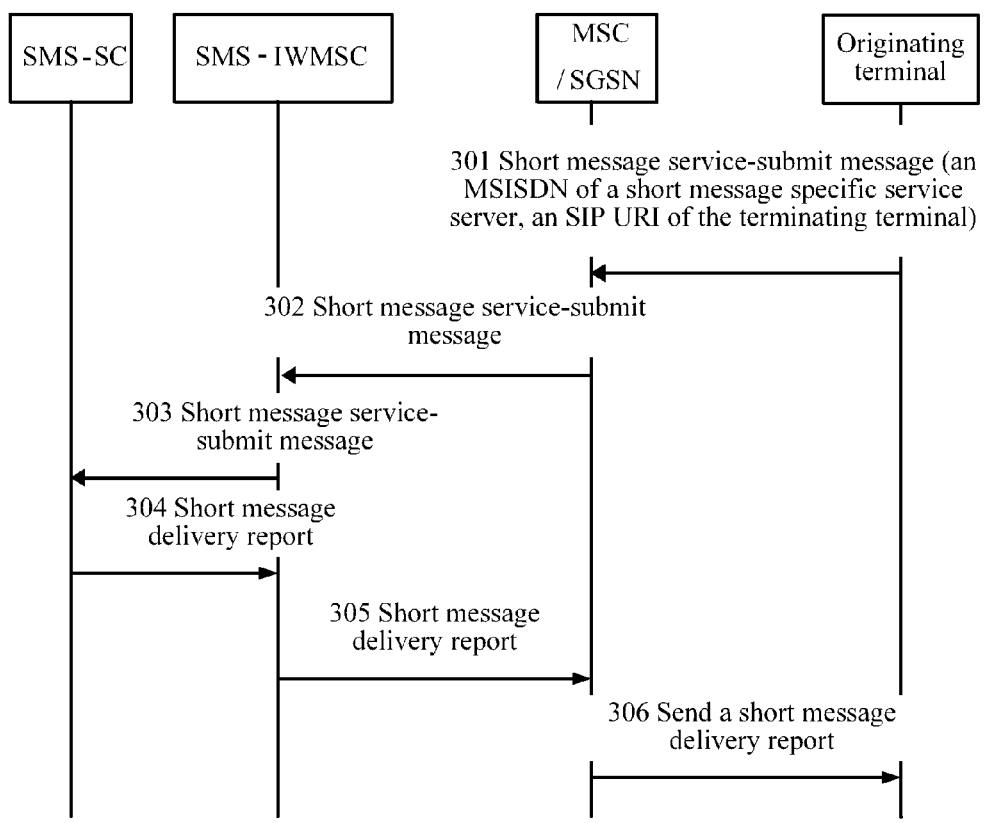
FIG. 3 is a schematic diagram of another embodiment of a short message sending method according to an embodiment of the present invention.
Figure 4:
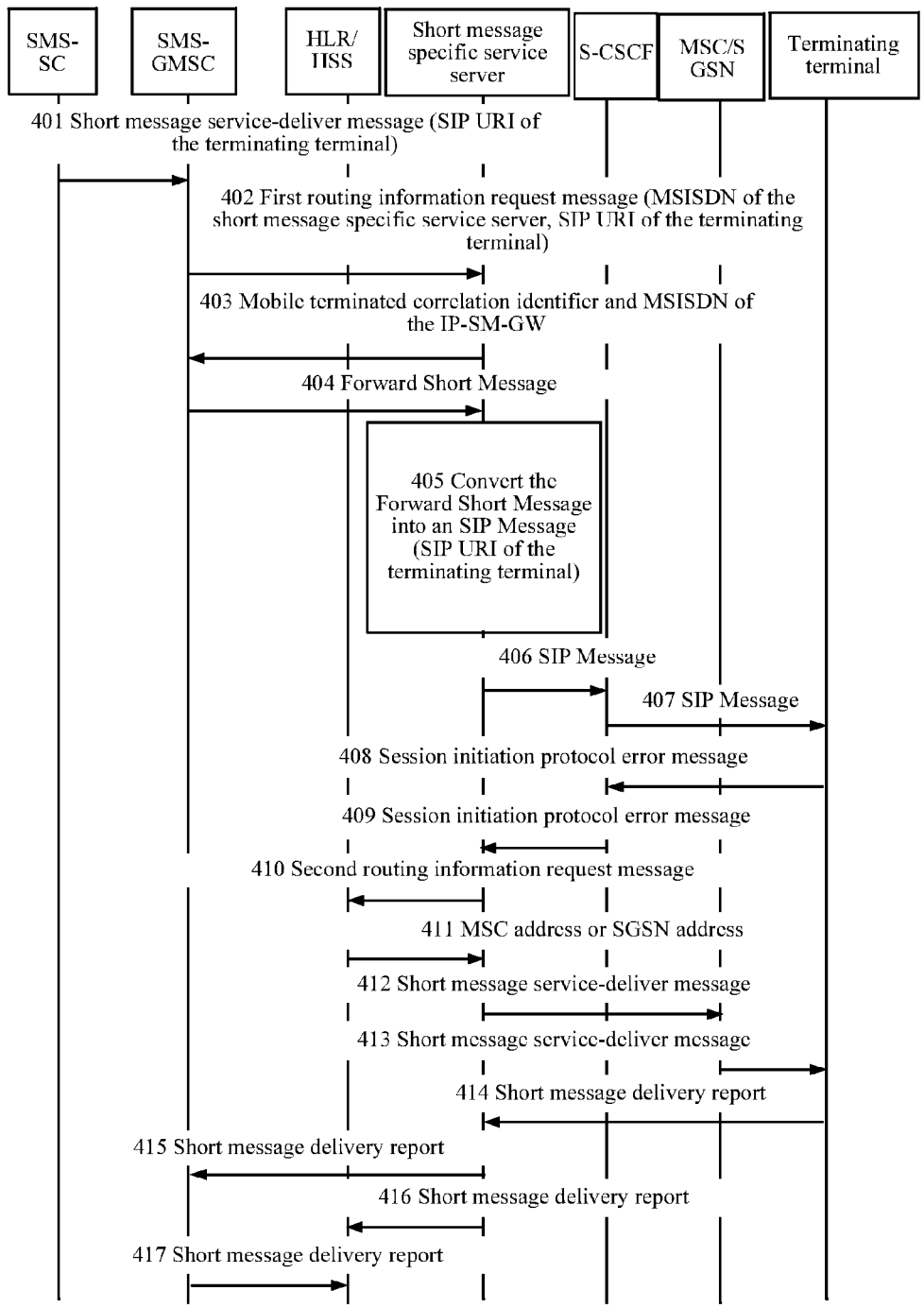
FIG. 4 is a schematic diagram of another embodiment of a short message receiving method according to an embodiment of the present invention.

To illustrate the foregoing embodiment in detail, please refer to a short message sending method shown in FIG. 3 and a short message receiving method shown in FIG. 4. An embodiment of the present invention provides a short message sending method, which, referring to FIG. 3, includes:

Step 301. A calling terminal sends an SMS-submit message to an MSC or SGSN.

The SMS-submit message carries an MSISDN of a short message specific service server, and the SMS-submit message carries an SIP URI of a called terminal. The MSISDN of the short message specific service server may be configured in the calling terminal, or when sending a short message, a user enters, in the calling terminal, the MSISDN of the short message specific service server as a called terminal address.

In the embodiment of the present invention, the calling terminal sends the SMS-submit message to the MSC or SGSN, where the SMS-submit message carries the MSISDN of the short message specific service server, and the SMS-submit message carries the SIP URI of the called terminal. The MSISDN of the short message specific service server is configured in the calling terminal, or when sending a short message, the user enters, in the calling terminal, the MSISDN of the short message specific service server as the called terminal address. In practical applications, the SMS-submit message carries the SIP URI of the called terminal, for example, an IMPU of the called terminal carried in the SMS-submit message is SIP:UE2@network2.com. The MSISDN of the short message specific service server may be preconfigured in the calling terminal, or when sending a short message, the user enters, in the calling terminal, the MSISDN of the short message specific service server as the called terminal address, so that when a calling terminal initiates to send a short message to an IMS terminal that does not have an MSISDN, the MSISDN of the server may be carried.

It should be noted that, that the calling terminal sends the SMS-submit message to the MSC or SGSN in step 301 may specifically include: sending, by the calling terminal, the SMS-submit message to the MSC, or, sending, by the calling terminal, the SMS-submit message to the SGSN. When the calling terminal adopts the CS domain, the SMS-submit message is sent to the MSC, and when the calling terminal adopts the PS domain, the SMS-submit message is sent to the SGSN. Specifically, the calling terminal selects either the MSC or the SGSN to send the message.

It should be noted that, in practical applications, as for that the SMS-submit message carries the MSISDN of the short message specific service server, one implementable manner is that, a TP-DA field of the SMS-submit message carries the MSISDN of the short message specific service server.

It should be noted that, in practical applications, as for that the SMS-submit message carries the SIP URI of the called terminal, one implementable manner is that, a TP User Data header of the SMS-submit message carries the SIP URI of the called terminal. For example, a destination address element may be newly defined for the TP User Data field header to carry the SIP URI of the called terminal.

In practical applications, as for that the SMS-submit message carries the SIP URI of the called terminal, another implementable manner is that, a TP User Data short message of the SMS-submit message carries the SIP URI of the called terminal.

It should be noted that, in practical applications, as for that a calling terminal sends an SMS-submit message to an MSC or SGSN, one implementable manner is that, the calling terminal encapsulates the SMS-submit message in an RP-MO-DATA message, and sends the RP-MO-DATA message to the MSC or SGSN.

It should be noted that, in the embodiment of the present invention, before the calling terminal sends the SMS-submit message to the MSC or SGSN, the calling terminal has already sent out an access request to a VLR, where an authentication process may be included. That the calling terminal sends out the access request and the authentication process belong to the prior art and are not described in detail herein.

Step 302. The MSC or SGSN sends the SMS-submit message to an SMS-IWMSC.

The SMS-submit message carries the MSISDN of the short message specific service server, and the SMS-submit message carries the SIP URI of the called terminal.

In the embodiment of the present invention, the meaning of that the MSC or SGSN sends the SMS-submit message to the SMS-IWMSC is that: if in step 301, the calling terminal sends the SMS-submit message to the MSC, at this time, the MSC sends the SMS-submit message to the SMS-IWMSC, and if in step 301, the calling terminal sends the SMS-submit message to the SGSN, at this time, the SGSN sends the SMS-submit message to the SMS-IWMSC.

It should be noted that, in the embodiment of the present invention, before step 302, a step may be further included, in which the MSC or SGSN verifies, with the VLR, whether a short message is allowed to be sent, so as to avoid a conflict with a carrier policy, supplementary service or the like.

Step 303. The SMS-IWMSC sends the SMS-submit message to the SMS-SC.

In the embodiment of the present invention, after the SMS-IWMSC receives the SMS-submit message from the MSC or SGSN, the SMS-IWMSC sends the SMS-submit message to the SMS-SC, so that the SMS-SC is capable of sending the SMS-submit message to the called terminal, thereby implementing short message communications between the calling terminal and the called terminal.

It should be noted that, in the embodiment of the present invention, after the SMS-IWMSC forwards a Forward Short Message to the SMS-SC, the following steps may be further included:

Step 304. The SMS-SC sends a short message delivery report to the SMS-IWMSC.

Step 305. The SMS-IWMSC sends the short message delivery report to the MSC or SGSN.

Step 306. The MSC or SGSN sends the short message delivery report to the calling terminal.

In the embodiment provided by the present invention, an SMS-submit message sent by a calling terminal to an MSC or SGSN and an MSISDN of a short message specific service server, and the SMS-submit message carries an SIP URI of a called terminal, so that the calling terminal is capable of sending the MSISDN of the short message specific service server and the SIP URI of the called terminal to an SMS-SC via the MSC or SGSN and an SMS-IWMSC, and the SMS-SC implements short message communications with the called terminal via an SMS-GMSC, an HLR or HSS, the short message specific service server, and an S-CSCF, thereby solving the problem that a calling terminal cannot send a short message to a called terminal that does not have an MSISDN, and implementing short message communications between a terminal and a terminal that does not have an MSISDN.

In the embodiment of FIG. 3, the short message sending method is introduced, in which a short message sending process is described. In the following, a short message receiving method corresponding to the embodiment of FIG. 3 to implement short message receiving processing is introduced. Referring to FIG. 4, an embodiment of the present invention provides a short message receiving method, including:

Step 401. An SMS-SC sends an SMS-deliver message and an MSISDN of a short message specific service server to an SMS-GMSC.

The SMS-deliver message carries an SIP URI of a called terminal.

In the embodiment of the present invention, after the SMS-SC receives, from a calling terminal, an SMS-submit message sent by the calling terminal, the SMS-SC sends the SMS-deliver message and the MSISDN of the short message specific service server to the SMS-GMSC, and the SMS-deliver message carries the SIP URI of the called terminal.

It should be noted that, in the embodiment of the present invention, the called terminal is also referred to as an IMS UE, an IMS registration or re-registration process has been completed before the SMS-SC sends the SMS-deliver message to the SMS-GMSC, the S-CSCF forwards registration information of the IMS UE to the short message specific service server, the short message specific service server further sends the registration information of the IMS UE and an IP-SM-GW address of the short message specific service server to an HLR/HSS. Only after the called terminal has completed the IMS registration or re-registration, the short message specific service server is capable of using an IMS network to send a short message to the called terminal.

It should be noted that, in practical applications, as for that the SMS-SC sends the SMS-deliver message and the MSISDN of the short message specific service server to the SMS-GMSC, one implementable manner is that, the SMS-deliver message is encapsulated in an RP-MT-DATA message, and an RP-DA field in the RP-MT-DATA message carries the MSISDN of the short message specific service server.

It should be noted that, in practical applications, the SMS-deliver message carries the SIP URI of the called terminal, one implementable manner is that, a TP User Data header of the SMS-deliver message carries the SIP URI of the called terminal. For example, the SIP URI of the called terminal is contained in the TP User Data field header, which may be carried by newly defining a destination address element for the TP User Data field header.

In practical applications, as for that the SMS-deliver message carries the SIP URI of the called terminal, another implementable manner is that a TP User Data short message of the SMS-deliver message carries the SIP URI of the called terminal.

It should be noted that, in practical applications, as for that the SMS-SC sends the SMS-deliver message to the SMS-GMSC, one implementable manner is that, the SMS-SC encapsulates the SMS-deliver message in the RP-MT-DATA message, and sends the RP-MT-DATA message to the SMS-GMSC.

Step 402. The SMS-GMSC sends a first routing information request message to the HLR or HSS, and the HLR or HSS forwards the first routing information request message to the short message specific service server.

The first routing information request message carries the MSISDN of the short message specific service server.

In the embodiment of the present invention, after receiving the SMS-deliver message sent by the SMS-SC, the SMS-GMSC sends the first routing information request message to the HLR or HSS according to the SMS-deliver message, and the HLR or HSS forwards the first routing information request message to the short message specific service server. It should be noted that, in the embodiment of the present invention, the meaning of that the SMS-GMSC sends the first routing information request message to the HLR or HSS is that: the SMS-GMSC sends the first routing information request message to the HLR, or the SMS-GMSC sends the first routing information request message to the HSS. The meaning of that the HLR or HSS forwards the first routing information request message to the short message specific service server is that: when the SMS-GMSC sends the first routing information request message to the HLR, the HLR forwards the first routing information request message to the short message specific service server, and when the SMS-GMSC sends the first routing information request message to the HSS, the HSS forwards the first routing information request message to the short message specific service server.

It should be noted that, in practical applications, as for that the first routing information request message carries the MSISDN of the short message specific service server, one implementable manner is that, an MSISDN field of the first routing information request message carries the MSISDN of the short message specific service server.

It should be noted that, the first routing information request message described in step 402 in the embodiment of the present invention is actually a type of routing request information, and in addition the second routing information request message described in subsequent step 410 is also a type of routing request information. The name first routing information request message in step 402 is only for distinction from the second routing information request message that appears in subsequent step 410, where "first" and "second" are not related in a time sequence or logically: when a first routing information request message appears, a second routing information request message is not necessarily required to appear, and definitely, when a second routing information request message appears, the first routing information request message is neither necessarily required to appear, and "first" and "second" are only for indicating that two routing information request messages are different. Definitely, to distinguish routing information request messages that appear in step 402 and step 410, other names can be adopted as long as it is indicated that the two routing information request messages are two different messages, for example, the names may be a routing information request message a and a routing information request message b, and so on.

Step 403. The short message specific service server generates a called correlation identifier, and returns the called correlation identifier and the MSISDN of the short message specific service server to the SMS-GMSC.

The called correlation identifier is used for correlating a Forward Short Message subsequently sent by the SMS-GMSC and the first routing information request message.

Step 404. The SMS-GMSC sends the Forward Short Message to the short message specific service server.

The Forward Short Message carries the MSISDN of the short message specific service server, the Forward Short Message carries the SIP URI of the called terminal, and the Forward Short Message carries the called correlation identifier.

In the embodiment of the present invention, after the SMS-GMSC receives the called correlation identifier and the MSISDN of the short message specific service server, the SMS-GMSC sends the Forward Short Message to the short message specific service server according to the MSISDN of the short message specific service server.

Step 405. The short message specific service server acquires the SIP URI of the called terminal from the Forward Short Message, and converts the Forward Short Message into an SIP Message.

A request uniform resource identifier of the SIP Message is the SIP URI of the called terminal.

In the embodiment of the present invention, the short message specific service server acquires the SIP URI of the called terminal from the Forward Short Message, and converts the Forward Short Message into the SIP Message, where the Request URI of the SIP Message is the SIP URI of the called terminal, and a message body of the SIP Message carries information content of the Forward Short Message.

It should be noted that, in practical applications, as for that the short message specific service server acquires the SIP URI of the called terminal from the Forward Short Message, one implementable manner is that, the short message specific service server acquires the SIP URI of the called terminal from a transfer layer protocol user data field header or transfer layer protocol user data field short message of the Forward Short Message.

Step 406. The short message specific service server sends the SIP Message to an S-CSCF.

In the embodiment of the present invention, the short message specific service server converts the Forward Short Message into an SIP Message, and the short message specific service server sends the SIP Message to the S-CSCF.

Step 407. The S-CSCF forwards the SIP Message to the called terminal.

In the embodiment of the present invention, after receiving the SIP Message from the short message specific service server, the S-CSCF forwards the SIP Message to the called terminal, so that the called terminal is capable of receiving the SIP Message, thereby implementing short message communications between the calling terminal and the called terminal.

It should be noted that, in the embodiment of the present invention, after the S-CSCF forwards the SIP Message to the called terminal in step 407, the following may further be included:

Step 408. If the called terminal fails to receive the SIP Message, the called terminal sends an SIP Error message to the S-CSCF.

Step 409. The S-CSCF forwards the session initiation protocol error message to the short message specific service server.

Step 410. The short message specific service server sends a second routing information request message to the HLR or HSS, where the second routing information request message carries the SIP URI or an IMSI of the called terminal.

Step 411. The HLR or HSS returns an MSC address or SGSN address to the short message specific service server according to the SIP URI or IMSI of the called terminal.

Step 412. The short message specific service server sends the SMS-deliver message to the MSC or SGSN.

In the embodiment of the present invention, the meaning of that the short message specific service server sends the SMS-deliver message to the MSC or SGSN is that: when the short message specific service server adopts a CS domain, the SMS-deliver message is sent to the MSC, and when the short message specific service server adopts a PS domain, the SMS-deliver message is sent to the SGSN. Specifically, the short message specific service server selects either the MSC or the SGSN to send the message.

Step 413. The MSC or SGSN forwards the SMS-deliver message to the called terminal.

In the embodiment of the present invention, the meaning of that the MSC or SGSN forwards the SMS-deliver message to the called terminal is that: when the short message specific service server adopts the CS domain, the MSC forwards the SMS-deliver message to the called terminal, and when the short message specific service server adopts the PS domain, the SGSN forwards the SMS-deliver message to the called terminal.

It should be noted that, after the MSC or SGSN forwards the SMS-deliver message to the called terminal in step 413, the following steps may be further included:

Step 414. The called terminal sends a short message delivery report to the short message specific service server through the MSC or SGSN to indicate that the called terminal has successfully received the short message.

Step 415. The short message specific service server forwards the short message delivery report to the SMS-GMSC.

Step 416. The short message specific service server sends a short message delivery status report to the HSS/HLR to indicate that the called terminal has successfully received the short message.

Step 417. The SMS-GMSC sends a short message delivery status report to the HSS/HLR, and the HSS/HLR neglects the short message delivery status report.

In the embodiment of the present invention, if the called terminal has successfully received the SIP Message, the embodiment of the present invention can further include the following method: the called terminal sends an SIP 200 OK message to the S-CSCF, and the S-CSCF forwards the SIP 200 OK message to the short message specific service server.

It should be noted that, after the S-CSCF forwards the SIP 200 OK message to the short message specific service server, it may be further included that the called terminal sends a short message delivery report to the short message specific service server through the S-CSCF to indicate that the called terminal has successfully received the short message.

The short message specific service server replies with an accept message to the UE through the S-CSCF.

The short message specific service server sends a short message delivery report to the SMS-GMSC.

The short message specific service server sends a short message delivery status report to the HLR/HSS to indicate that the UE has successfully received the short message.

The SMS-GMSC sends a short message delivery status report to the HLR/HSS, and the HLR/HSS neglects the short message delivery status report.

In the embodiment provided by the present invention, an SMS-SC sends an SMS-deliver message and an MSISDN of a short message specific service server to an SMS-GMSC, and the SMS-deliver message carries an SIP URI of a called terminal, so that an SMS-SC implements short message communications with the called terminal via the SMS-GMSC, HLR or HSS, short message specific service server, and S-CSCF, thereby solving the problem that a calling terminal cannot send a short message to a called terminal that does not have an MSISDN, and implementing short message communications between a terminal and a terminal that does not have an MSISDN.

An embodiment of the present invention provides another short message processing method, including: sending, by a calling terminal, a, SMS-submit message to an MSC or SGSN, where the SMS-submit message carries an SIP URI of a called terminal, the SIP URI is an IMPU of the called terminal, the SMS-submit message is received by the MSC or SGSN and then sent to an SMS-IWMSC, and sent by the SMS-IWMSC to an SMS-SC; sending, by the SMS-SC, an SMS-deliver message to an SMS-GMSC, where the SMS-deliver message carries the SIP URI of the called terminal, and after the SMS-deliver message is received by the SMS-GMSC, sending, by the SMS-GMSC, a Forward Short Message to an IP-SM-GW, where the Forward Short Message carries the SIP URI of the called terminal; and acquiring, by the IP-SM-GW, the SIP URI of the called terminal from the Forward Short Message, and sending, by the IP-SM-GW, an SIP Message to the called terminal, where a request uniform resource identifier of the SIP Message is the SIP URI of the called terminal.

In another embodiment provided by the present invention, an SMS-submit message sent by a calling terminal to an MSC or SGSN carries an SIP URI of a called terminal, so that the calling terminal is capable of sending the SIP URI of the called terminal to an SMS-SC via the MSC or SGSN and an SMS-IWMSC, and the SMS-SC implements short message communications with the called terminal via an SMS-GMSC and an IP-SM-GW, thereby solving the problem that a calling terminal cannot send a short message to a called terminal that does not have an MSISDN, and implementing short message communications between a terminal and a terminal that does not have an MSISDN.

Figure 5:
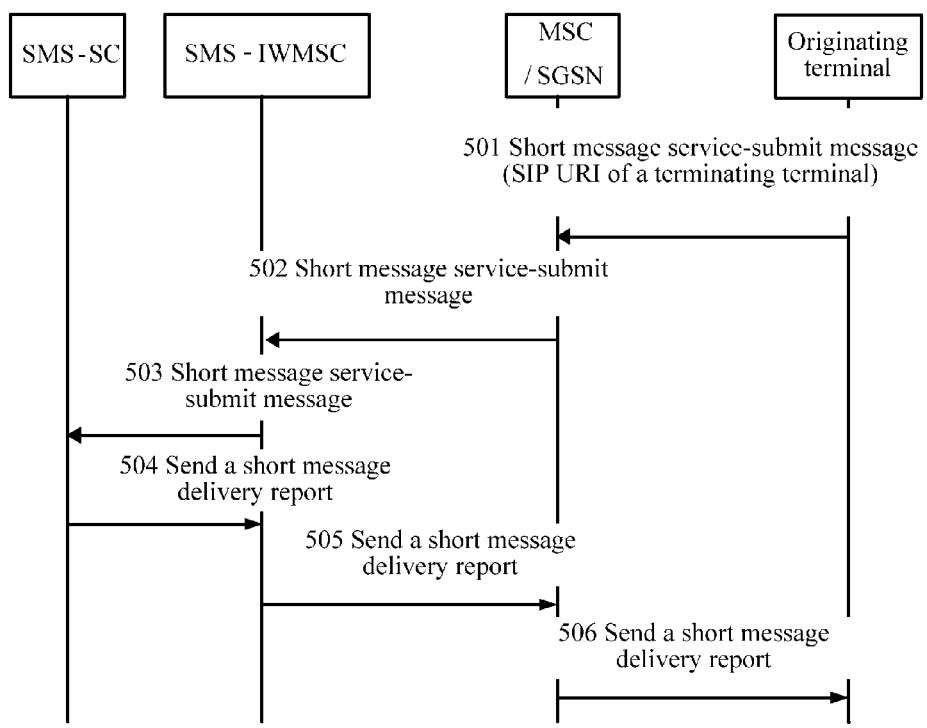
FIG. 5 is a schematic diagram of another embodiment of a short message sending method according to an embodiment of the present invention.
Figure 6:
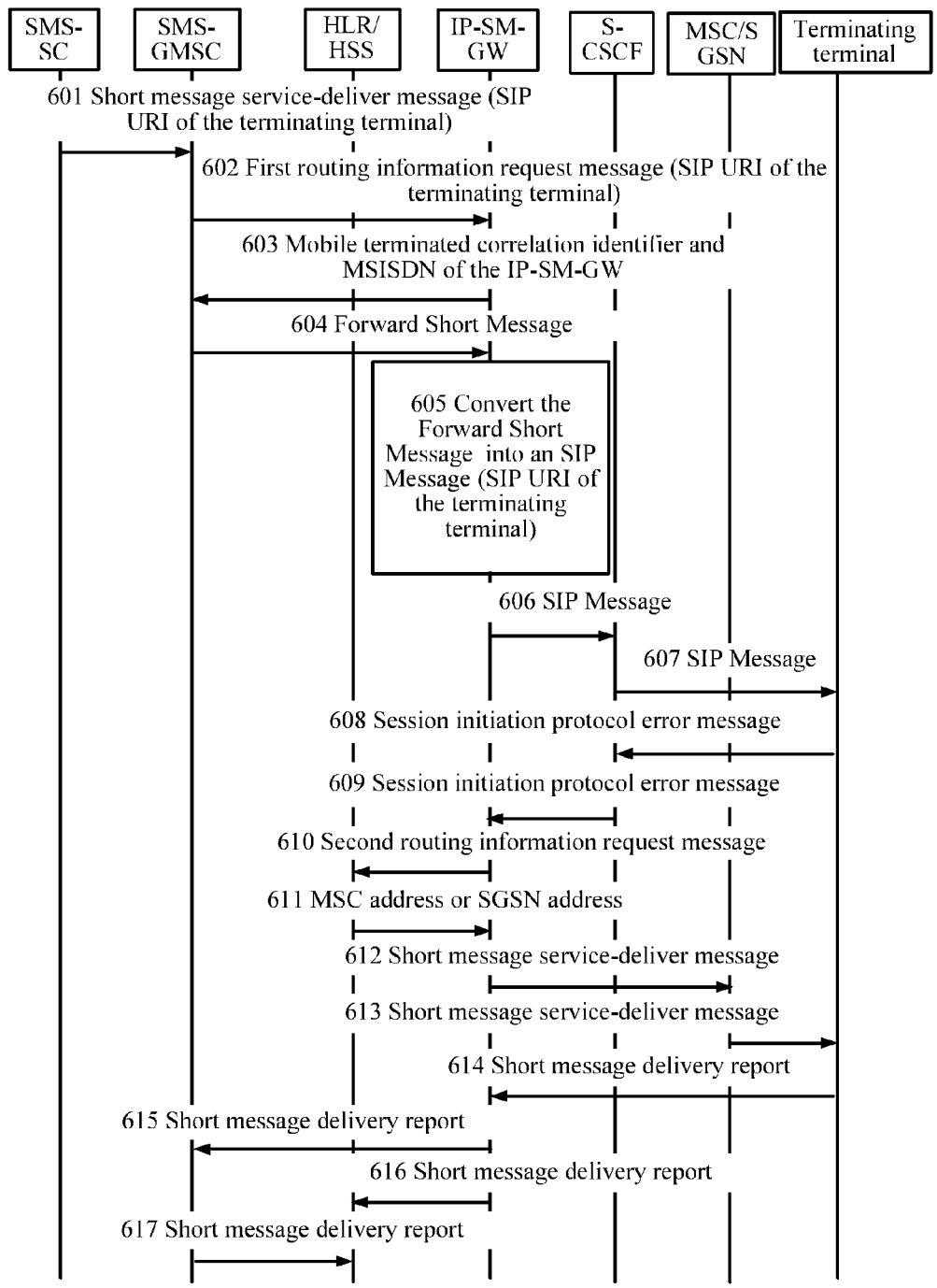
FIG. 6 is a schematic diagram of another embodiment of a short message receiving method according to an embodiment of the present invention.

To illustrate the foregoing embodiment in detail, please refer to a short message sending method shown in FIG. 5 and a short message receiving method shown in FIG. 6. An embodiment of the present invention provides a short message sending method, which, referring to FIG. 5, includes:

Step 501. A calling terminal sends an SMS-submit message to an MSC or SGSN.

The SMS-submit message carries an SIP URI of a called terminal.

In the embodiment of the present invention, the calling terminal sends the SMS-submit message to the MSC or SGSN, where the SMS-submit message carries the SIP URI of the called terminal. In practical applications, the SMS-submit message carries the SIP URI of the called terminal, for example, an IMPU of the called terminal carried in the SMS-submit message is SIP:UE2@network2.com.

It should be noted that, that the calling terminal sends the SMS-submit message to the MSC or SGSN in step 501 may specifically include: sending, by the calling terminal, the SMS-submit message to the MSC, or, sending, by the calling terminal, the SMS-submit message to the SGSN. When the calling terminal adopts the CS domain, the SMS-submit message is sent to the MSC, and when the calling terminal adopts the PS domain, the SMS-submit message is sent to the SGSN. Specifically, the calling terminal selects either the MSC or the SGSN to send the message.

It should be noted that, in practical applications, as for that the SMS-submit message carries the SIP URI of the called terminal, one implementable manner is that, a TP-DA field of the SMS-submit message carries the SIP URI of the called terminal.

In practical applications, as for that the SMS-submit message carries the SIP URI of the called terminal, another implementable manner is that a TP User Data field header of the SMS-submit message carries the SIP URI of the called terminal. For example, the SIP URI of the called terminal is contained in a TP User Data field header, and may be carried by newly defining a destination address element for the TP User Data field header.

In practical applications, as for that the SMS-submit message carries the SIP URI of the called terminal, another implementable manner is that a TP User Data field short message of the SMS-submit message carries the SIP URI of the called terminal.

In practical applications, as for that the SMS-submit message carries the SIP URI of the called terminal, another implementable manner is that a preset newly-defined field in the SMS-submit message carries the SIP URI of the called terminal.

It should be noted that, in practical applications, as for that the calling terminal sends the SMS-submit message to the MSC or SGSN, one implementable manner is that, the calling terminal encapsulates the SMS-submit message in an RP-MO-DATA message, and sends the RP-MO-DATA message to the MSC or SGSN.

It should be noted that, in the embodiment of the present invention, before the calling terminal sends the SMS-submit message to the MSC or SGSN, the calling terminal has already sent out an access request to a VLR, where an authentication process may be included. That the calling terminal sends out the access request and the authentication process belong to the prior art and are not described in detail herein.

Step 502. The MSC or SGSN sends the SMS-submit message to an SMS-IWMSC.

The SMS-submit message carries the SIP URI of the called terminal.

In the embodiment of the present invention, the meaning of that the MSC or SGSN sends the SMS-submit message to an SMS-IWMSC is that: if in step 501, the calling terminal sends the SMS-submit message to the MSC, at this time, the MSC sends the SMS-submit message to the SMS-IWMSC, and if in step 501, the calling terminal sends the SMS-submit message to the SGSN, at this time, the SGSN sends the SMS-submit message to the SMS-IWMSC.

It should be noted that, in the embodiment of the present invention, before step 502, a step may be further included, in which the MSC or SGSN verifies, with the VLR, whether a short message is allowed to be sent, so as to avoid a conflict with a carrier policy, supplementary service or the like.

Step 503. The SMS-IWMSC sends the SMS-submit message to the SMS-SC.

In the embodiment of the present invention, after the SMS-IWMSC receives the SMS-submit message from the MSC or SGSN, the SMS-IWMSC sends the SMS-submit message to the SMS-SC, so that the SMS-SC is capable of sending the SMS-submit message to the called terminal, thereby implementing short message communications between the calling terminal and the called terminal.

It should be noted that, in various embodiments of the present invention, after the SMS-IWMSC forwards a Forward Short Message to the SMS-SC, the following steps may be further included:

Step 504. The SMS-SC sends a short message delivery report to the SMS-IWMSC.

Step 505. The SMS-IWMSC sends the short message delivery report to the MSC or SGSN.

Step 506. The MSC or SGSN sends the short message delivery report to the calling terminal.

In the embodiment provided by the present invention, an SMS-submit message sent by a calling terminal to an MSC or SGSN carries an SIP URI of a called terminal, so that the calling terminal is capable of sending the SIP URI of the called terminal to an SMS-SC via the MSC or SGSN and an SMS-IWMSC, and the SMS-SC implements short message communications with the called terminal via an SMS-GMSC, HLR or HSS, IP-SM-GW, and S-CSCF, thereby solving the problem that a calling terminal cannot send a short message to a called terminal that does not have an MSISDN, and implementing short message communications between a terminal and a terminal that does not have an MSISDN.

In the embodiment in FIG. 5, the short message sending method is introduced, where a short message sending process is described. In the following, a short message receiving method corresponding to the embodiment in FIG. 5 to implement short message receiving processing is introduced. Referring to FIG. 6, an embodiment of the present invention provides a short message receiving method, including:

Step 601. An SMS-SC sends an SMS-deliver message to an SMS-GMSC.

The SMS-deliver message carries an SIP URI of a called terminal.

In the embodiment of the present invention, after the SMS-SC receives, from a calling terminal, an SMS-submit message sent by the calling terminal, and the SMS-SC sends the SMS-deliver message to the SMS-GMSC, where the SMS-deliver message carries the SIP URI of the called terminal.

It should be noted that, in the embodiment of the present invention, the called terminal is also referred to as an IMS UE, an IMS registration or re-registration process has been completed before the SMS-SC sends the SMS-deliver message to the SMS-GMSC, the S-CSCF forwards registration information of the IMS UE to an IP-SM-GW, and the IP-SM-GW further sends the registration information of the IMS UE and an address of the IP-SM-GW to an HLR/HSS. Only after the called terminal has completed the IMS registration or re-registration, the IP-SM-GW is capable of using an IMS network to send a short message to the called terminal.

It should be noted that, in practical applications, as for that the SMS-deliver message carries the SIP URI of the called terminal, one implementable manner is that, the SMS-deliver message is encapsulated in an RP-MT-DATA message, and an RP-DA field of the RP-MT-DATA carries the SIP URI of the called terminal.

It should be noted that, in practical applications, as for that the SMS-SC sends the SMS-deliver message to the SMS-GMSC, one implementable manner is that, the SMS-SC encapsulates the SMS-deliver message in an RP-MT-DATA message, and sends the RP-MT-DATA message to the SMS-GMSC.

602. The SMS-GMSC sends a first routing information request message to the HLR or HSS, and the HLR or HSS forwards the first routing information request message to the IP-SM-GW.

The first routing information request message carries the SIP URI of the called terminal.

In the embodiment of the present invention, after receiving the SMS-deliver message sent by the SMS-SC, the SMS-GMSC sends a first routing information request message to the HLR or HSS according to the SMS-deliver message, and the HLR or HSS forwards the first routing information request message to the IP-SM-GW. It should be noted that, in the embodiment of the present invention, the meaning of that the SMS-GMSC sends the first routing information request message to the HLR or HSS is: the SMS-GMSC sends the first routing information request message to the HLR, or the SMS-GMSC sends the first routing information request message to the HSS. The meaning of that the HLR or HSS forwards the first routing information request message to the IP-SM-GW is that: when the SMS-GMSC sends the first routing information request message to the HLR, the HLR forwards the first routing information request message to the IP-SM-GW, and when the SMS-GMSC sends the first routing information request message to the HSS, the HSS forwards the first routing information request message to the IP-SM-GW.

It should be noted that, in practical applications, as for that the first routing information request message carries the SIP URI of the called terminal, one implementable manner is that, a preset newly-defined field in the first routing information request message carries the SIP URI of the called terminal, for example, the preset newly-defined field is an SIP URI field for carrying the SIP URI of the called terminal.

It should be noted that, the first routing information request message described in step 602 in the embodiment of the present invention is actually two different messages routing request information, in addition the second routing information request message described in subsequent step 610 is also a type of routing request information, the name first routing information request message in step 602 is for distinction from the second routing information request message that appears in subsequent step 610, where "first" and "second" are not related in a time order or logically: when a first routing information request message appears, a second routing information request message is not necessarily required to appear, and definitely, when a second routing information request message appears, the first routing information request message is neither necessarily required to appear, and "first" and "second" are only for indicating that two routing information request messages are different. Definitely, to distinguish routing information request messages that appear in step 602 and step 610, other names can be adopted as long as it is indicated that the two routing information request messages are two different messages, for example, the names may be a routing information request message a and a routing information request message b, and so on.

Step 603. The IP-SM-GW generates a called correlation identifier, and returns the called correlation identifier and the MSISDN of the IP-SM-GW to the SMS-GMSC.

The called correlation identifier is used for correlating a Forward Short Message subsequently sent by the SMS-GMSC and the first routing information request message.

Step 604. The SMS-GMSC sends the Forward Short Message to the IP-SM-GW.

The Forward Short Message carries the SIP URI of the called terminal, and the Forward Short Message carries the called correlation identifier.

Step 605. The IP-SM-GW from the Forward Short Message acquires the SIP URI of the called terminal, and converts the Forward Short Message into an SIP Message.

A request uniform resource identifier of the SIP Message is the SIP URI of the called terminal.

In the embodiment of the present invention, the IP-SM-GW acquires the SIP URI of the called terminal from the Forward Short Message, converts the Forward Short Message into an SIP Message, and the Request URI of the SIP Message is the SIP URI of the called terminal, a message body of the SIP Message carries information content of the Forward Short Message.

Step 606. The IP-SM-GW sends the SIP Message to the S-CSCF.

Step 607. The S-CSCF forwards the SIP Message to the called terminal.

In the embodiment of the present invention, after receiving the SIP Message from the IP-SM-GW, the S-CSCF forwards the SIP Message to the called terminal, so that the called terminal is capable of receiving the SIP Message, thereby implementing the short message communications between the calling terminal and the called terminal.

It should be noted that, in the embodiment of the present invention, after the S-CSCF forwards the SIP message to the called terminal in step 607, the following may further be included:

Step 608. If the called terminal fails to receive the SIP Message, the called terminal sends an SIP Error message to the S-CSCF.

Step 609. The S-CSCF forwards the session initiation protocol error message to the IP-SM-GW.

Step 610. The IP-SM-GW sends a second routing information request message to the HLR or HSS, where the second routing information request message carries the SIP URI or an IMSI of the called terminal.

Step 611. The HLR or HSS returns an MSC address or SGSN address to the IP-SM-GW according to the SIP URI or IMSI of the called terminal.

Step 612. The IP-SM-GW sends the SMS-deliver message to the MSC or SGSN.

In the embodiment of the present invention, the meaning of that the IP-SM-GW sends the SMS-deliver message to the MSC or SGSN is that: when the IP-SM-GW adopts the CS domain, the SMS-deliver message is sent to the MSC, and when the IP-SM-GW adopts the PS domain, the SMS-deliver message is sent to the SGSN. Specifically, the IP-SM-GW selects either the MSC or the SGSN to send the message.

Step 613. The MSC or SGSN forwards the SMS-deliver message to the called terminal.

In the embodiment of the present invention, the meaning of that the MSC or SGSN forwards the SMS-deliver message to the called terminal is that: when the IP-SM-GW adopts the CS domain, the MSC forwards the SMS-deliver message to the called terminal, and when the IP-SM-GW adopts the PS domain, the SGSN forwards the SMS-deliver message to the called terminal.

It should be noted that, after the MSC or SGSN forwards the SMS-deliver message to the called terminal in step 613, the following steps may be further included:

Step 614. The called terminal sends a short message delivery report to the IP-SM-GW through the MSC or SGSN to indicate that the called terminal has successfully received the short message.

Step 615. The IP-SM-GW forwards the short message delivery report to the SMS-GMSC.

Step 616. The IP-SM-GW sends a short message delivery status report to the HLR/HSS to indicate that the called terminal has successfully received the short message.

Step 617. The SMS-GMSC sends a short message delivery status report to the HLR/HSS, and the HLR/HSS neglects the short message delivery status report.

In the embodiment of the present invention, if the called terminal has successfully received the SIP Message, the embodiment of the present invention can further include the following method: the called terminal sends an SIP 200 OK message to the S-CSCF, and the S-CSCF forwards the SIP 200 OK message to the IP-SM-GW.

It should be noted that, after the S-CSCF forwards the SIP 200 OK message to the IP-SM-GW, it may be further included that the called terminal sends a short message delivery report to the IP-SM-GW through the S-CSCF to indicate that the called terminal has successfully received the short message.

The IP-SM-GW replies with an accept message to the UE through the S-CSCF.

The IP-SM-GW sends a short message delivery report to the SMS-GMSC.

The IP-SM-GW sends a short message delivery status report to the HSS/HLR to indicate that the UE has successfully received the short message.

The SMS-GMSC sends a short message delivery status report to the HSS/HLR, and the HSS/HLR neglects the short message delivery status report.

In the embodiment provided by the present invention, an SMS-deliver message sent by an SMS-SC to an SMS-GMSC has an SIP URI of a called terminal, so that the SMS-SC is capable of implementing short message communications with the called terminal via the SMS-GMSC, an HLR or HSS, an IP-SM-GW, and an S-CSCF, thereby solving the problem that a calling terminal cannot send a short message to a called terminal that does not have an MSISDN, and implementing short message communications between a terminal and a terminal that does not have an MSISDN.

Another short message processing method provided in an embodiment of the present invention is introduced in the following, including: sending, by a calling terminal, an SMS-submit message to an MSC or SGSN, where the SMS-submit message carries an indication that a called terminal does not have an MSISDN, the SMS-submit message carries an SIP URI of the called terminal, and the SIP URI is an IMPU of the called terminal; and acquiring, by the MSC or SGSN, according to the indication carried in the SMS-submit message, the SIP URI of the called terminal from the SMS-submit message, and sending, by the MSC or SGSN, through an S-CSCF, an SIP Message to the called terminal, where a request uniform resource identifier of the SIP Message is the SIP URI of the called terminal.

Figure 7:
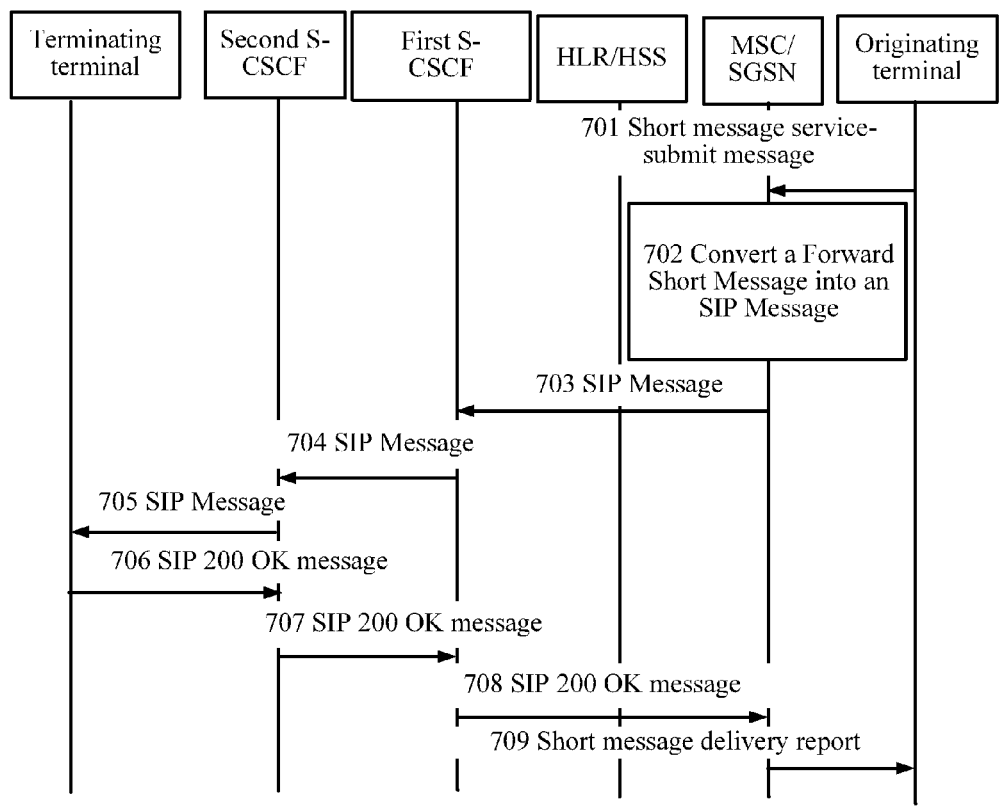
FIG. 7 is a schematic diagram of another embodiment of a short message processing method according to an embodiment of the present invention.

To illustrate the short message processing method in detail, one detailed embodiment is introduced, which, referring to FIG. 7, includes:

Step 701. A calling terminal sends an SMS-submit message to an MSC or SGSN.

The SMS-submit message carries an indication that a called terminal does not have an MSISDN, and the SMS-submit message carries an SIP URI of the called terminal.

In the embodiment of the present invention, the calling terminal sends the SMS-submit message to the MSC or SGSN, where the SMS-submit message carries the indication that the called terminal does not have an MSISDN, and the SMS-submit message carries the SIP URI of the called terminal. In practical applications, the SMS-submit message carries the SIP URI of the called terminal, for example, an IMPU of the called terminal carried in the SMS-submit message is SIP:UE2@network2.com.

It should be noted that, that the calling terminal sends the SMS-submit message to the MSC or SGSN in step 701 may specifically include: sending, by the calling terminal, the SMS-submit message to the MSC, or, sending, by the calling terminal, the SMS-submit message to the SGSN. When the calling terminal adopts a CS domain, the SMS-submit message is sent to the MSC, and when the calling terminal adopts a PS domain, the SMS-submit message is sent to the SGSN. Specifically, the calling terminal selects either the MSC or the SGSN to send the message.

It should be noted that, in practical applications, as for that the SMS-submit message carries the indication that the called terminal does not have an MSISDN, one implementable manner is that, a TP-DA field of the SMS-submit message carries the indication that the called terminal does not have an MSISDN, and a specific value may be taken as the field value of the field to indicate that the SMS-submit message carries the indication that the called terminal does not have an MSISDN.

As for that the SMS-submit message carries the indication that the called terminal does not have an MSISDN, another implementable manner is that a TP-PID field of the SMS-submit message carries the indication that the called terminal does not have an MSISDN, and a specific value may be taken as the field value of the field to indicate that the SMS-submit message carries the indication that the called terminal does not have an MSISDN.

As for that the SMS-submit message carries the indication that the called terminal does not have an MSISDN, another implementable manner is that a preset newly-defined field in the SMS-submit message carries the indication that the called terminal does not have an MSISDN, for example, the preset newly-defined field is a TP-DMI, and a specific value may be taken as the field value of the field to indicate that the SMS-submit message carries the indication that the called terminal does not have an MSISDN.

It should be noted that, in practical applications, as for that the SMS-submit message carries the SIP URI of the called terminal, one implementable manner is that, a TP User Data field header of the SMS-submit message carries the SIP URI of the called terminal. For example, a destination address element may be newly defined for the TP User Data field header to carry the SIP URI of the called terminal.

In practical applications, as for that the SMS-submit message carries the SIP URI of the called terminal, another implementable manner is that a TP User Data field short message of the SMS-submit message carries the SIP URI of the called terminal.

It should be noted that, in practical applications, as for that the calling terminal sends the SMS-submit message to the MSC or SGSN, one implementable manner is that, the calling terminal encapsulates the SMS-submit message in an RP-MO-DATA message, and sends the RP-MO-DATA message to the MSC or SGSN.

It should be noted that, in the embodiment of the present invention, before the calling terminal sends the SMS-submit message to the MSC or SGSN, the calling terminal has sent out an access request to the VLR, where an authentication process may be included. That the calling terminal sends out the access request and the authentication process belong to the prior art and are not described in detail herein.

Step 702. The MSC or SGSN acquires, according to the indication carried in the SMS-submit message, the SIP URI of the called terminal from the SMS-submit message, and converts the SMS-submit message into an SIP Message.

A request uniform resource identifier of the SIP Message is the SIP URI of the called terminal.

In the embodiment of the present invention, the MSC or SGSN is capable of obtaining, according to an indication carried in an SMS-submit message, that the called terminal does not have an MSISDN, the MSC or SGSN acquires the SIP URI of the called terminal from the SMS-submit message, and converts the SMS-submit message into the SIP Message, the Request URI of the called terminal is the SIP URI of the called terminal, and a message body of the SIP Message carries information content of the SMS-submit message.

It should be noted that, in practical applications, as for that the MSC or SGSN acquires the SIP URI of the called terminal from the SMS-submit message, one implementable manner is that, the MSC or SGSN acquires the SIP URI of the called terminal from a transfer layer protocol user data field header or transfer layer protocol user data field short message of the SMS-submit message.

It should be noted that, the meaning of that the MSC or SGSN acquires, according to the indication carried in the SMS-submit message, the SIP URI of the called terminal from the SMS-submit message, and converts the SMS-submit message into the SIP Message is that: if the calling terminal adopts the CS domain, the MSC acquires, according to the indication carried in the SMS-submit message, the SIP URI of the called terminal from the SMS-submit message, and converts the SMS-submit message into an SIP Message, and if the calling terminal adopts the PS domain, the SGSN acquires, according to the indication carried in the SMS-submit message, the SIP URI of the called terminal from the SMS-submit message, and converts the SMS-submit message into the SIP Message.

Step 703. The MSC or SGSN sends the SIP Message to a first S-CSCF.

The first S-CSCF is a session initiation protocol server to which the calling terminal is homing.

It should be noted that, the meaning of that the MSC or SGSN sends the SIP Message to the first S-CSCF is that: if the calling terminal adopts the CS domain, the MSC sends the SIP Message to the first S-CSCF, and if the calling terminal adopts the PS domain, the SGSN sends the SIP Message to the first S-CSCF.

It should be noted that, the first S-CSCF described in step 703 in the embodiment of the present invention is actually a type of S-CSCF, and in addition, the second S-CSCF described in subsequent step 704 is also a type of S-CSCF, the name first S-CSCF in step 703 is for distinction from the second S-CSCF that appears in subsequent step 704, where "first" and "second" are not related in a time sequence or logically: when a first S-CSCF appears, a second S-CSCF is not necessarily required to appear, and definitely when a second S-CSCF appears, a first S-CSCF is neither necessarily required to appear, and "first" and "second" are only for indicating that two S-CSCFs are different. Definitely, to distinguish S-CSCFs that appear in step 703 and step 704, other names can be adopted, as long as it is indicated that the S-CSCFs are two different S-CSCFs, for example, the names may be an S-CSCF a and an S-CSCF b.

Step 704. The first S-CSCF sends the SIP Message to the second S-CSCF.

The second S-CSCF is a session initiation protocol server to which the called terminal is homing.

In the embodiment of the present invention, when the first S-CSCF receives the SIP Message, the SIP Message is directly sent to the second S-CSCF, so that the second S-CSCF forwards the SIP Message to the called terminal, thereby implementing short message communications between the calling terminal and the called terminal.

Step 705. The second S-CSCF forwards the SIP Message to the called terminal.

In the embodiment of the present invention, after receiving the SIP Message from the first S-CSCF, the second S-CSCF forwards the SIP Message to the called terminal, so that the called terminal is capable of receiving the SIP Message, thereby implementing short message communications between the calling terminal and the called terminal.

In the embodiment of the present invention, if the called terminal has successfully received the SIP Message, the embodiment of the present invention can further include the following method:

Step 706. The called terminal sends an SIP 200 OK message to the second S-CSCF.

Step 707. The second S-CSCF forwards the SIP 200 OK message to the first S-CSCF.

Step 708. The first S-CSCF sends the SIP 200 OK message to the MSC or SGSN to indicate that the called terminal has successfully received the short message.

Step 709. The MSC or SGSN sends a short message delivery report to the calling terminal.

In the embodiment provided by the present invention, an SMS-submit message sent by a calling terminal to an MSC or SGSN carries an indication that a called terminal does not have an MSISDN, the SMS-submit message carries an IMPU of the called terminal in the form of an SIP URI, so that the calling terminal is capable of sending the indication and the SIP URI of the called terminal to a first S-CSCF via the MSC or SGSN, and the first S-CSCF implements short message communications with the called terminal via a second S-CSCF, thereby solving the problem that a calling terminal cannot send a short message to a called terminal that does not have an MSISDN, and implementing short message communications between a terminal and a terminal that does not have an MSISDN.

Another short message processing method provided in an embodiment of the present invention is introduced in the following, which, referring to FIG. 8, includes:

Step 801: A calling terminal sends a short message to an IWF.

The short message carries a non-MSISDN identifier of a called terminal.

In the embodiment of the present invention, the called terminal does not have an MSISDN, and the calling terminal, when sending a short message, carries the non-MSISDN identifier of the called terminal, for example, the short message may specifically carry a fully qualified domain name (FQDN), and the short message may also carry a uniform resource name (URN). Definitely, an identifier other than an MSISDN may also be carried, which is not limited here.

In the embodiment of the present invention, when the calling terminal needs to send a short message to the called terminal, the calling terminal first sends a short message to the inter-working function entity, and the short message carries the non-MSISDN identifier of the called terminal.

Step 802. The IWF maps the identifier of the called terminal as an IMSI of the called terminal, and sends an SMS-submit message to an SMS-SC, where the SMS-submit message carries the IMSI of the called terminal.

In the embodiment of the present invention, after receiving the short message of the calling terminal, the IWF maps the non-MSISDN identifier carried in the short message as the IMSI of the called terminal.

Step 803. The SMS-SC sends an SMS-deliver message to an SMS-GMSC.

The SMS-deliver message carries the IMSI of the called terminal.

Step 804. The SMS-GMSC sends a first routing information request message to an HLR or HSS, and the HLR or HSS forwards the first routing information request message to an IP-SM-GW.

The first routing information request message carries the IMSI of the called terminal.

Step 805. The IP-SM-GW generates a called correlation identifier, and returns the called correlation identifier and an MSISDN of the IP-SM-GW to the SMS-GMSC.

The called correlation identifier is used for correlating a Forward Short Message subsequently sent by the SMS-GMSC and the first routing information request message.

Step 806. The SMS-GMSC sends the Forward Short Message to the IP-SM-GW.

The Forward Short Message carries the called correlation identifier.

Step 807. The IP-SM-GW converts the Forward Short Message into an SIP Message.

A request uniform resource identifier of the SIP Message is the SIP URI of the called terminal. The SIP URI of the called terminal is obtained by the IP-SM-GW through mapping according to the IMSI of the called terminal, or the SIP URI of the called terminal is obtained by the HLR or HSS through mapping according to the IMSI of the called terminal and sent to the IP-SM-GW.

Step 808. The IP-SM-GW sends the SIP Message to the S-CSCF.

Step 809. The S-CSCF forwards the SIP Message to the called terminal.

In the embodiment of the present invention, after receiving the SIP Message from the IP-SM-GW, the S-CSCF forwards the SIP Message to the called terminal, so that the called terminal is capable of receiving the SIP Message, thereby implementing short message communications between the calling terminal and the called terminal.

It should be noted that, in the embodiment of the present invention, after the S-CSCF forwards the SIP Message to the called terminal in step 808, step 810 to step 819 may be further included. Step 810 to step 819 are similar to step 208 to step 217 in FIG. 2, which are not described in detail herein.

In the embodiment of the present invention, if the called terminal has successfully received the SIP Message, the embodiment of the present invention can further include the following method: the called terminal sends an SIP 200 OK message to the S-CSCF, and the S-CSCF forwards the SIP 200 OK message to the IP-SM-GW.

It should be noted that, after the S-CSCF forwards the SIP 200 OK message to the IP-SM-GW, it may be further included that the called terminal sends a short message delivery report to the IP-SM-GW through the S-CSCF to indicate that the called terminal has successfully received the short message.

The IP-SM-GW replies with an accept message to the UE through the S-CSCF.

The IP-SM-GW sends a short message delivery report to the SMS-GMSC.

The IP-SM-GW sends a short message delivery status report to the HSS/HLR to indicate that the UE has successfully received the short message.

The SMS-GMSC sends a short message delivery status report to the HSS/HLR, and the HSS/HLR neglects the short message delivery status report.

In the embodiment provided by the present invention, a short message sent by a calling terminal to an IWF carries a non-MSISDN identifier of a called terminal, the IWF is capable of mapping the identifier of the called terminal as an IMSI of the called terminal and sending the IMSI of the called terminal to an SMS-SC, and the SMS-SC implements short message communications with the called terminal via an SMS-GMSC, HLR or HSS, IP-SM-GW, S-CSCF, thereby solving the problem that a calling terminal cannot send a short message to a called terminal that does not have an MSISDN, and implementing short message communications between a terminal and a terminal that does not have an MSISDN.

The foregoing embodiments introduce the short message processing method provided by the present invention, and in the following a corresponding device for implementing the short message processing method provided in the embodiment of the present invention is introduced.

An embodiment of the present invention provides a short message processing system, which includes a calling terminal, an MSC or SGSN, an SMSSMS-IWMSC, an SMS-SC, an SMS-GMSC an IP-SM-GW, and a called terminal.

The calling terminal is configured to send an SMS-submit message to the MSC or SGSN, where the SMS-submit message carries an indication that the called terminal does not have an MSISDN, the SMS-submit message carries an SIP URI of the called terminal, and the SIP URI is an IMPU of the called terminal.

The MSC or SGSN is configured to receive the SMS-submit message sent by the calling terminal, and send the SMS-submit message to the SMS-IWMSC.

The SMS-IWMSC is configured to receive the SMS-submit message sent by the MSC or SGSN, and forward the SMS-submit message to the SMS-SC.

The SMS-SC is configured to receive the SMS-submit message forwarded by the SMS-IWMSC, send, to the SMS-GMSC, an SMS-deliver message and the indication that the called terminal does not have an MSISDN, where the SMS-deliver message carries the SIP URI of the called terminal.

The SMS-GMSC is configured to receive the SMS-deliver message and the indication that the called terminal does not have an MSISDN that are sent by the SMS-SC, and send the indication and a Forward Short Message to the IP-SM-GW, where the Forward Short Message carries the SIP URI of the called terminal.

The IP-SM-GW is configured to acquire the SIP URI of the called terminal from the Forward Short Message according to the indication, and send an SIP Message to the called terminal, where a request uniform resource identifier of the SIP Message is the SIP URI of the called terminal.

The called terminal is configured to receive the SIP Message sent by the IP-SM-GW.

The short message processing system in the embodiment of the present invention may specifically include a short message sending system 900 shown in FIG. 9 and a short message receiving system 1000 shown in FIG. 10, which are illustrated in detail in the following.

Figure 9:
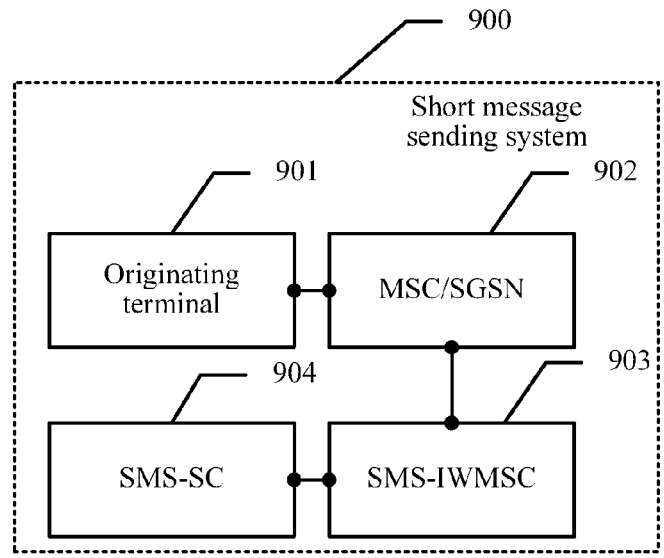
FIG. 9 is a schematic diagram of an embodiment of a short message sending system according to an embodiment of the present invention.

Referring to FIG. 9, an embodiment of the present invention provides the short message sending system 900, which includes a calling terminal 901, an MSC or SGSN 902, an SMS-IWMSC 903, and an SMS-SC 904.

The calling terminal 901 is configured to send an SMS-submit message to the MSC or SGSN 902, where the SMS-submit message carries an indication that a called terminal does not have an MSISDN, and the SMS-submit message carries an SIP URI of the called terminal.

The MSC or SGSN 902 is configured to receive the SMS-submit message sent by the calling terminal 901, send the SMS-submit message to the SMS-IWMSC 903, where the SMS-submit message carries the indication that the called terminal does not have an MSISDN, and the SMS-submit message carries the SIP URI of the called terminal.

The SMS-IWMSC 903 is configured to receive the SMS-submit message sent by the MSC or SGSN, and forward the SMS-submit message to the SMS-SC.

The SMS-SC 904 is configured to receive the SMS-submit message forwarded by the SMS-IWMSC.

It should be noted that, content such as information exchange and execution processes of the modules/units of the foregoing device is according to a same concept as that of the method embodiments of the present invention, and therefore brings a same technical effect as that of the method embodiments of the present invention, and for specific content, reference may be made to the illustration of the method embodiment in FIG. 1 of the present invention, which is not described in detail herein.

In the embodiment provided by the present invention, the SMS-submit message sent by the calling terminal 901 to the MSC or SGSN 902 carries the indication that the called terminal does not have an MSISDN, the SMS-submit message carries the SIP URI of the called terminal, so that the calling terminal is capable of sending the indication and the SIP URI of the called terminal to the SMS-SC 904 via the MSC or SGSN and the SMS-IWMSC 903, so that the SMS-SC 904 implements short message communications with the called terminal via the SMS-GMSC, HLR or HSS, IP-SM-GW, S-CSCF, thereby solving the problem that the calling terminal 901 cannot send a short message to a called terminal that does not have an MSISDN, thereby implementing short message communications between a terminal and a terminal that does not have an MSISDN.

In the embodiment shown in FIG. 9, the short message sending system is introduced, where a short message sending process is described. In the following, a short message receiving system corresponding to the embodiment in FIG. 9 to implement short message receive processing is introduced, and referring to FIG. 10, an embodiment of the present invention provides a short message receiving system 1000, which includes an SMS-SC 1001, an SMS-GMSC 1002, an HLR or HSS 1003, an IP-SM-GW 1004, an S-CSCF 1005, and a called terminal 1006.

The SMS-SC 1001 is configured to send, to the SMS-GMSC 1002, an SMS-deliver message and an indication that a called terminal does not have an MSISDN, where the SMS-deliver message carries an SIP URI of the called terminal.

The SMS-GMSC 1002 is configured to receive the SMS-deliver message sent by the SMS-SC 1001, and send a first routing information request message to the HLR or HSS 1003, where the first routing information request message carries an indication that a called terminal does not have an MSISDN.

The HLR or HSS 1003 is configured to receive the first routing information request message sent by the SMS-GMSC 1002, and forward the first routing information request message to the IP-SM-GW 1004.

The IP-SM-GW 1004 is configured to receive the first routing information request message sent by the HLR or HSS 1003, generate a called correlation identifier, and return the called correlation identifier and the MSISDN of the IP-SM-GW to the SMS-GMSC 1002, where the called correlation identifier is used for correlating a Forward Short Message subsequently sent by the SMS-GMSC 1002 and the first routing information request message.

The SMS-GMSC 1002 is configured to receive the called correlation identifier and the MSISDN of the IP-SM-GW returned by the IP-SM-GW 1004, and send the Forward Short Message to the IP-SM-GW 1004, where the Forward Short Message carries the indication that the called terminal does not have an MSISDN, the Forward Short Message carries the IMPU of the called terminal in the form of the SIP URI, and the Forward Short Message carries the called correlation identifier.

The IP-SM-GW 1004 is configured to receive the Forward Short Message sent by the SMS-GMSC, acquire the SIP URI of the called terminal from the Forward Short Message according to the indication carried in the Forward Short Message, and convert the Forward Short Message into an SIP Message, where a request uniform resource identifier of the SIP Message is the SIP URI of the called terminal.

The IP-SM-GW 1004 is configured to send the SIP Message to the S-CSCF.

The S-CSCF 1005 is configured to receive the SIP Message sent by the IP-SM-GW, and forward the SIP Message to the called terminal.

The called terminal 1006 is configured to receive the SIP Message forwarded by the called terminal.

Figure 10:
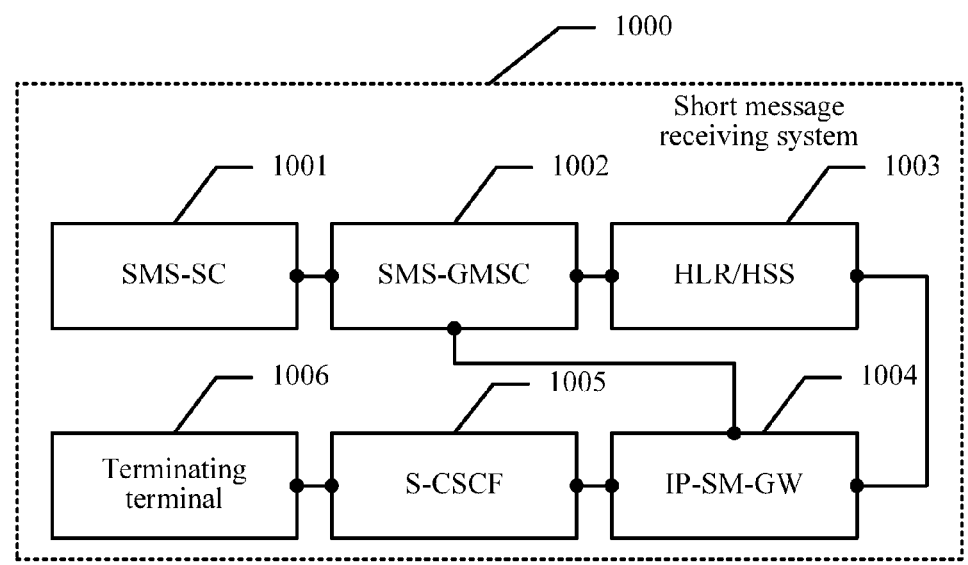
FIG. 10 is a schematic diagram of an embodiment of a short message receiving system according to an embodiment of the present invention.

It should be noted that, in the embodiment of the present invention, the short message receiving system 1000 further includes an MSC or SGSN (not shown in FIG. 10).

The called terminal 1006 is further configured to, when the called terminal 1006 fails to receive the SIP Message, send a session initiation protocol error message to the S-CSCF 1005.

The S-CSCF 1005 is further configured to receive the session initiation protocol error message sent by the called terminal 1006, and forward the session initiation protocol error message to the IP-SM-GW 1004.

The IP-SM-GW 1004 is further configured to receive the session initiation protocol error message forwarded by the S-CSCF 1005, and send a second routing information request message to the HLR or HSS 1003, where the second routing information request message carries the SIP URI or an IMSI of the called terminal 1006.

The HLR or HSS 1003 is further configured to receive the second routing information request message sent by the IP-SM-GW 1004, and return an MSC address or SGSN address to the IP-SM-GW 1004 according to the SIP URI or IMSI of the called terminal 1006.

The IP-SM-GW 1004 is further configured to receive the MSC address or SGSN address returned by the HLR or HSS 1003, and send the SMS-deliver message to the MSC or SGSN.

The MSC or SGSN is further configured to receive the SMS-deliver message sent by the IP-SM-GW 1004, and forward the SMS-deliver message to the called terminal.

The called terminal 1006 is further configured to receive the SMS-deliver message forwarded by the MSC or SGSN.

It should be noted that, the called terminal 1006 is further configured to, when the called terminal 1006 has received the SIP Message successfully, send an SIP 200 OK message to the S-CSCF 1005.

The S-CSCF 1005 is further configured to receive the SIP 200 OK message sent by the called terminal 1006, and forward the SIP 200 OK message to the IP-SM-GW 1004.

The IP-SM-GW 1004 is further configured to receive the SIP 200 OK message forwarded by the S-CSCF 1005.

It should be noted that, content such as information exchange and execution processes of the modules/units of the foregoing device is according to a same concept as that of the method embodiments of the present invention, and therefore brings a same technical effect as that of the method embodiments of the present invention, and for specific content, reference may be made to the illustration of the method embodiment in FIG. 2 of the present invention, which is not described in detail herein.

In the embodiment provided by the present invention, an SMS-deliver message sent by an SMS-SC to an SMS-GMSC carries an indication that a called terminal does not have an MSISDN, the SMS-deliver message carries the SIP URI of the called terminal, so that the SMS-SC implements short message communications with the called terminal via the SMS-GMSC, an HLR or HSS, an IP-SM-GW, and an S-CSCF, thereby solving the problem that a calling terminal cannot send a short message to a called terminal that does not have an MSISDN, and implementing short message communications between a terminal and a terminal that does not have an MSISDN.

An embodiment of the present invention provides another short message processing system, which includes a calling terminal, an MSC or SGSN, an SMS-IWMSC, an SMS-SC, an SMS-GMSC, a short message specific service server, and called terminal.

The calling terminal is configured to send an SMS-submit message to the MSC or SGSN, where the SMS-submit message carries an MSISDN of the short message specific service server, the SMS-submit message carries an SIP URI of the called terminal, and the SIP URI is an IMPU of the called terminal.

The MSC or SGSN is configured to receive the SMS-submit message sent by the calling terminal, and forward the SMS-submit message to the SMS-IWMSC.

The SMS-IWMSC is configured to receive the SMS-submit message sent by the MSC or SGSN, and forward the SMS-submit message to the SMS-SC.

The SMS-SC is configured to receive the SMS-submit message forwarded by the SMS-IWMSC, and send an SMS-deliver message and the MSISDN of the short message specific service server to the SMS-GMSC, where the SMS-deliver message carries the SIP URI of the called terminal.

The SMS-GMSC is configured to receive the SMS-deliver message and the MSISDN of the short message specific service server that are sent by the SMS-SC, and send a Forward Short Message to the short message specific service server, where the Forward Short Message carries the SIP URI of the called terminal.

The short message specific service server is configured to receive the Forward Short Message sent by the SMS-GMSC, acquire the SIP URI of the called terminal from the Forward Short Message, and send an SIP Message to the called terminal, where a request uniform resource identifier of the SIP Message is the SIP URI of the called terminal.

The called terminal is configured to receive the SIP Message sent by the short message specific service server.

Figure 11:
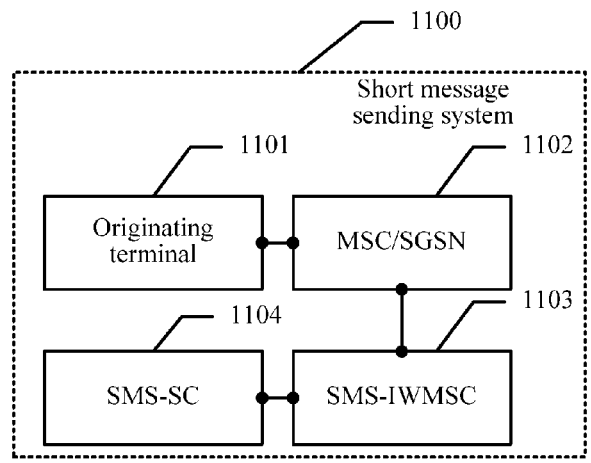
FIG. 11 is a schematic diagram of another embodiment of a short message sending system according to an embodiment of the present invention.

Another short message processing system in the embodiment of the present invention may specifically include a short message sending system 1100 shown in FIG. 11 and a short message receiving system 1200 shown in FIG. 12, which are illustrated in the following in detail.

Another short message sending system provided in an embodiment of the present invention is introduced in the following. Referring to FIG. 11, the short message sending system 1100 includes a calling terminal 1101, an MSC or SGSN 1102, an SMS-IWMSC 1103, and an SMS-SC 1104.

The calling terminal 1101 is configured to send an SMS-submit message to the MSC or SGSN 1102, where the SMS-submit message carries an MSISDN of the short message specific service server, the SMS-submit message carries an SIP URI of the called terminal, the MSISDN of the short message specific service server is configured in the calling terminal 1101, or when sending a short message, a user enters, in the calling terminal 1101, the MSISDN of the short message specific service server as the called terminal address.

The MSC or SGSN 1102 is configured to receive the SMS-submit message sent by the calling terminal 1101, send the SMS-submit message to the SMS-IWMSC 1103, where the SMS-submit message carries the MSISDN of the short message specific service server, and the SMS-submit message carries the SIP URI of the called terminal.

The SMS-IWMSC 1103 is configured to receive the SMS-submit message sent by the MSC or SGSN 1102, and forward the SMS-submit message to the SMS-SC.

The SMS-SC 1104 is configured to receive the SMS-submit message forwarded by the SMS-IWMSC 1103.

It should be noted that, content such as information exchange and execution processes of the modules/units of the foregoing device is according to a same concept as that of the method embodiments of the present invention, and therefore brings a same technical effect as that of the method embodiments of the present invention, and for specific content, reference may be made to the illustration of the method embodiment in FIG. 3 of the present invention, which is not described in detail herein.

In the embodiment provided by the present invention, an SMS-submit message sent by a calling terminal to an MSC or SGSN carries an MSISDN of a short message specific service server, and the SMS-submit message carries an SIP URI of a called terminal, so that the calling terminal is capable of sending the MSISDN of the short message specific service server and the SIP URI of the called terminal to an SMS-SC via the MSC or SGSN and an SMS-IWMSC, and the SMS-SC implements short message communications with the called terminal via an SMS-GMSC, HLR or HSS, short message specific service server, and S-CSCF, thereby solving the problem that a calling terminal cannot send a short message to a called terminal that does not have an MSISDN, and implementing short message communications between a terminal and a terminal that does not have an MSISDN.

In the short message sending system in the embodiment shown in FIG. 11, a short message sending process is described, and a short message receiving system corresponding to the embodiment in FIG. 11 to implement short message receiving processing is introduced in the following. Referring to FIG. 12, an embodiment of the present invention provides a short message receiving system 1200, which includes an SMS-SC 1201, an SMS-GMSC 1202, an HLR or HSS 1203, a short message specific service server 1204, an S-CSCF 1205, and a called terminal 1206.

The SMS-SC 1201 is configured to send, to the SMS-GMSC 1202, an SMS-deliver message and an MSISDN of the short message specific service server 1204, where the SMS-deliver message carries an SIP URI of the called terminal.

The SMS-GMSC 1202 is configured to receive the SMS-deliver message sent by the SMS-SC 1201, and send a first routing information request message to the HLR or HSS 1203, where the first routing information request message carries the MSISDN of the short message specific service server 1204.

The HLR or HSS 1203 is configured to receive the first routing information request message sent by the SMS-GMSC 1202, and forward the first routing information request message to the short message specific service server 1204.

The short message specific service server 1204 is configured to receive the first routing information request message forwarded by the HLR or HSS 1203, generate a called correlation identifier, and return the called correlation identifier and the MSISDN of the IP-SM-GW to the SMS-GMSC 1202, where the called correlation identifier is used for correlating a Forward Short Message subsequently sent by the SMS-GMSC 1202 and the first routing information request message.

The SMS-GMSC 1202 is configured to receive the called correlation identifier and the MSISDN of the IP-SM-GW returned by the short message specific service server 1204, and send the Forward Short Message to the short message specific service server 1204, where the Forward Short Message carries the MSISDN of the short message specific service server 1204, the Forward Short Message carries an IMPU of the called terminal 1206 in the form of the SIP URI, and the Forward Short Message carries the called correlation identifier.

The short message specific service server 1204 is configured to receive the Forward Short Message sent by the SMS-GMSC 1202, acquire the SIP URI of the called terminal 1206 from the Forward Short Message, and convert the Forward Short Message into an SIP Message, where a request uniform resource identifier of the SIP Message is the SIP URI of the called terminal 1206.

The short message specific service server 1204 is configured to send the SIP Message to the S-CSCF 1205.

The S-CSCF 1205 is configured to receive the SIP Message sent by the short message specific service server 1204, and forward the SIP Message to the called terminal 1206.

The called terminal 1206 is configured to receive the SIP Message forwarded by the S-CSCF 1205.

Figure 12:
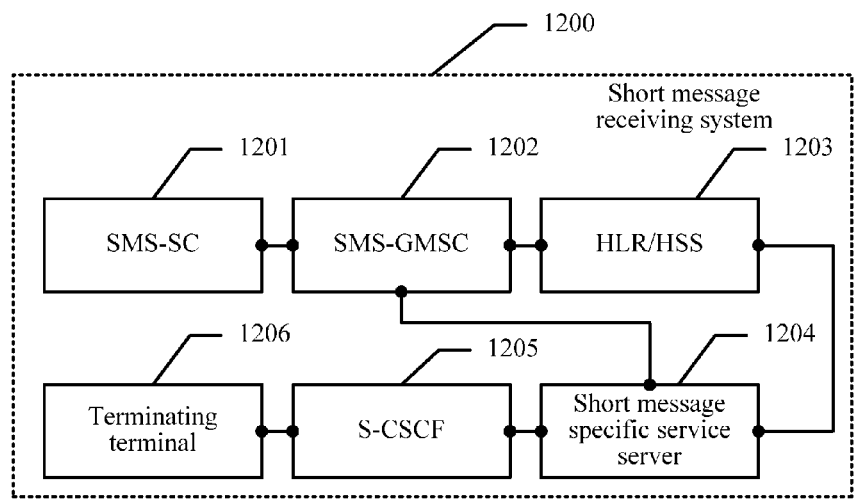
FIG. 12 is a schematic diagram of another embodiment of a short message receiving system according to an embodiment of the present invention.

It should be noted that, the short message receiving system 1200 in the embodiment of the present invention further includes an MSC or SGSN (not shown in FIG. 12).

The called terminal 1206 is further configured to, when the called terminal fails to receive the SIP Message, send a session initiation protocol error message to the S-CSCF 1205.

The S-CSCF 1205 is further configured to receive the session initiation protocol error message sent by the called terminal 1206, and forward the session initiation protocol error message to the short message specific service server 1204.

The short message specific service server 1204 is further configured to receive the session initiation protocol error message forwarded by the S-CSCF 1205, and send a second routing information request message to the HLR or HSS 1203, where the second routing information request message carries the SIP URI or an IMSI of the called terminal 1206.

The HLR or HSS 1203 is further configured to receive the second routing information request message sent by the short message specific service server 1204, and return an MSC address or SGSN address to the short message specific service server 1204 according to the SIP URI or IMSI of the called terminal 1206.

The short message specific service server 1204 is further configured to receive the MSC address or SGSN address returned by the HLR or HSS 1203, and send the SMS-deliver message to the MSC or SGSN.

The MSC or SGSN is further configured to receive the SMS-deliver message sent by the short message specific service server 1204, and forward the SMS-deliver message to the called terminal 1206.

The called terminal 1206 is further configured to receive the SMS-deliver message forwarded by the MSC or SGSN.

It should be noted that, the called terminal 1206 is further configured to, when the called terminal 1206 has received the SIP Message successfully, send an SIP 200 OK message to the S-CSCF 1205.

The S-CSCF 1205 is further configured to receive the SIP 200 OK message sent by the called terminal 1206, and forward the SIP 200 OK message to the short message specific service server 1204.

The short message specific service server 1204 is further configured to receive the SIP 200 OK message forwarded by the S-CSCF 1205.

It should be noted that, content such as information exchange and execution processes of the modules/units of the foregoing device is according to a same concept as that of the method embodiments of the present invention, and therefore brings a same technical effect as that of the method embodiments of the present invention, and for specific content, reference may be made to the illustration of the method embodiment in FIG. 4 of the present invention, which is not described in detail herein.

In the embodiment provided by the present invention, an SMS-deliver message sent by an SMS-SC to an SMS-GMSC carries an MSISDN of a short message specific service server, and the SMS-deliver message carries an IMPU of a called terminal in the form of an SIP URI, so that the SMS-SC implements short message communications with the called terminal via the SMS-GMSC, an HLR or HSS, the short message specific service server, and an S-CSCF, thereby solving the problem that a calling terminal cannot send a short message to a called terminal that does not have an MSISDN, and implementing short message communications between a terminal and a terminal that does not have an MSISDN.

An embodiment of the present invention provides another short message processing system, which includes a calling terminal, an MSC or SGSN, an SMS-IWMSC, an SMS-SC, an SMS-GMSC, an HLR or HSS, an IP-SM-GW, and a called terminal.

The calling terminal is configured to send an SMS-submit message to the MSC or SGSN, where the SMS-submit message carries an SIP URI of the called terminal, and the SIP URI is an IMPU of the called terminal.

The MSC or SGSN is configured to receive the SMS-submit message sent by the calling terminal, and forward the SMS-submit message to the SMS-IWMSC.

The SMS-IWMSC is configured to receive the SMS-submit message sent by the MSC or SGSN, and forward the SMS-submit message to the SMS-SC.

The SMS-SC is configured to receive the SMS-submit message forwarded by the SMS-IWMSC, and send an SMS-deliver message to the SMS-GMSC, where the SMS-deliver message carries the SIP URI of the called terminal.

The SMS-GMSC is configured to receive the SMS-deliver message sent by the SMS-SC, and send a Forward Short Message to the IP-SM-GW, where the Forward Short Message carries the SIP URI of the called terminal.

The IP-SM-GW is configured to acquire the SIP URI of the called terminal from the Forward Short Message, and send an SIP Message to the called terminal, where a request uniform resource identifier of the SIP Message is the SIP URI of the called terminal.

The called terminal is configured to receive the SIP Message sent by the IP-SM-GW.

Another short message processing system in the embodiment of the present invention may specifically include a short message sending system 1300 shown in FIG. 13 and a short message receiving system 1400 shown in FIG. 14, which are illustrated in detail in the following.

Another short message sending system provided in an embodiment of the present invention is introduced in the following. Referring to FIG. 13, the short message sending system 1300 includes a calling terminal 1301, an MSC or SGSN 1302, an SMS-IWMSC 1303, and an SMS-SC 1304.

The calling terminal 1301 is configured to send an SMS-submit message to the MSC or SGSN 1302, where the SMS-submit message carries an SIP URI of the called terminal.

The MSC or SGSN 1302 is configured to receive the SMS-submit message sent by the calling terminal 1301, and send the SMS-submit message to the SMS-IWMSC 1303, where the SMS-submit message carries the SIP URI of the called terminal.

The SMS-IWMSC 1303 is configured to receive the SMS-submit message sent by the MSC or SGSN 1302, and forward the SMS-submit message to the SMS-SC 1304.

The SMS-SC 1304 is configured to receive the SMS-submit message forwarded by the SMS-IWMSC 1303.

It should be noted that, content such as information exchange and execution processes of the modules/units of the foregoing device is according to a same concept as that of the method embodiments of the present invention, and therefore brings a same technical effect as that of the method embodiments of the present invention, and for specific content, reference may be made to the illustration of the method embodiment in FIG. 5 of the present invention, which is not described in detail herein.

In the embodiment provided by the present invention, an SMS-submit message sent by a calling terminal to an MSC or SGSN carries an SIP URI, so that the calling terminal is capable of sending the SIP URI of the called terminal to an SMS-SC via the MSC or SGSN and an SMS-IWMSC, and the SMS-SC implements short message communications with the called terminal via an SMS-GMSC, HLR or HSS, IP-SM-GW, and S-CSCF, thereby solving the problem that a calling terminal cannot send a short message to a called terminal that does not have an MSISDN, and implementing short message communications between a terminal and a terminal that does not have an MSISDN.

Figure 13:
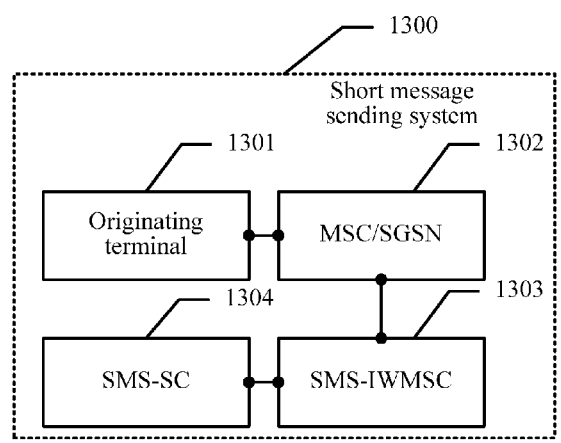
FIG. 13 is a schematic diagram of another embodiment of a short message sending system according to an embodiment of the present invention.

In the embodiment shown in FIG. 13, a short message sending system is introduced, where a short message sending process is described. In the following, a short message receiving system corresponding to the embodiment of FIG. 13 to implement short message receiving processing is introduced. Referring to FIG. 14, an embodiment of the present invention provides a short message receiving system 1400, which includes an SMS-SC 1401, an SMS-GMSC 1402, an HLR or HSS 1403, an IP-SM-GW 1404, an S-CSCF 1405, and a called terminal 1406.

The SMS-SC 1401 is configured to send an SMS-deliver message to an SMS-GMSC 1402, where the SMS-deliver message carries an IMPU of the called terminal 1406 in the form of an SIP URI.

The SMS-GMSC 1402 is configured to receive the SMS-deliver message sent by the SMS-SC 1401, and send a first routing information request message to the HLR or HSS 1403, where the first routing information request message carries the SIP URI of the called terminal 1406.

The HLR or HSS 1403 is configured to receive the first routing information request message sent by the SMS-GMSC 1402, and forward the first routing information request message to the IP-SM-GW 1404.

The IP-SM-GW 1404 is configured to receive the first routing information request message forwarded by the HLR or HSS 1403, generate a called correlation identifier, and return the called correlation identifier and an MSISDN of the IP-SM-GW to the SMS-GMSC 1402, where the called correlation identifier is used for correlating a Forward Short Message subsequently sent by the SMS-GMSC 1402 and the first routing information request message.

The SMS-GMSC 1402 is configured to receive the called correlation identifier and the MSISDN of the IP-SM-GW returned by the IP-SM-GW 1404, and send the Forward Short Message to the IP-SM-GW 1404, where the Forward Short Message carries the IMPU of the called terminal in the form of the SIP URI, and the Forward Short Message carries the called correlation identifier.

The IP-SM-GW 1404 is configured to receive the Forward Short Message sent by the SMS-GMSC 1402, acquire the SIP URI of the called terminal 1406 from the Forward Short Message, and convert the Forward Short Message into an SIP Message, where a request uniform resource identifier of the SIP Message is the SIP URI of the called terminal.

The IP-SM-GW 1404 is configured to send the SIP Message to the S-CSCF 1405.

The S-CSCF 1405 is configured to receive the SIP Message sent by the IP-SM-GW 1404, and forward the SIP Message to the called terminal 1406.

The called terminal 1406 is configured to receive the SIP Message forwarded by the S-CSCF 1405.

Figure 14:
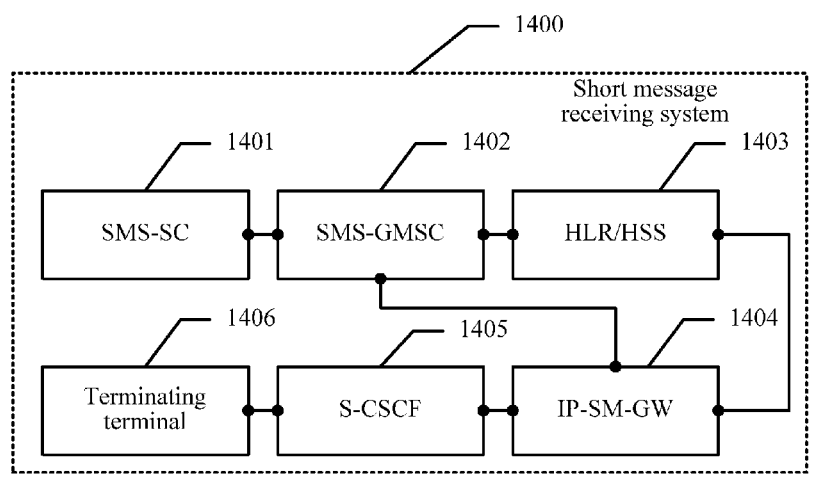
FIG. 14 is a schematic diagram of an embodiment of a short message receiving system according to an embodiment of the present invention.

It should be noted that, the short message receiving system 1400 in the embodiment of the present invention further includes an MSC or SGSN (not shown in FIG. 14).

The called terminal 1406 is further configured to when the called terminal 1406 fails to receive the SIP Message, send a session initiation protocol error message to the S-CSCF 1405.

The S-CSCF 1405 is further configured to receive the session initiation protocol error message sent by the called terminal 1406, and forward the session initiation protocol error message to the IP-SM-GW 1404.

The IP-SM-GW 1404 is further configured to receive the session initiation protocol error message forwarded by the S-CSCF 1405, and send a second routing information request message to the HLR or HSS 1403, where the second routing information request message carries the SIP URI or an IMSI of the called terminal 1406.

The HLR or HSS 1403 is further configured to receive the second routing information request message sent by the IP-SM-GW 1404, and return an MSC address or SGSN address to the IP-SM-GW 1404 according to the SIP URI or IMSI of the called terminal 1406.

The IP-SM-GW 1404 is further configured to receive the MSC address or SGSN address returned by the HLR or HSS 1403, and send an SMS-deliver message to the MSC or SGSN.

The MSC or SGSN is further configured to receive the SMS-deliver message sent by the IP-SM-GW 1404, and forward the SMS-deliver message to the called terminal 1406.

The called terminal 1406 is further configured to receive the SMS-deliver message forwarded by the MSC or SGSN.

It should be noted that, the called terminal 1406 is further configured to, when the called terminal 1406 has received the SIP Message successfully, send an SIP 200 OK message to the S-CSCF 1405.

The S-CSCF 1405 is further configured to receive the SIP 200 OK message sent by the called terminal 1406, and forward the SIP 200 OK message to the IP-SM-GW 1404.

The IP-SM-GW 1404 is further configured to receive the SIP 200 OK message forwarded by the S-CSCF 1405.

It should be noted that, content such as information exchange and execution processes of the modules/units of the foregoing device is according to a same concept as that of the method embodiments of the present invention, and therefore brings a same technical effect as that of the method embodiments of the present invention, and for specific content, reference may be made to the illustration of the method embodiment in FIG. 6 of the present invention, which is not described in detail herein.

In the embodiment provided by the present invention, an SMS-deliver message sent by an SMS-SC to an SMS-GMSC carries an IMPU of a called terminal in the form of an SIP URI, so that the SMS-SC is capable of implementing short message communications with the called terminal via the SMS-GMSC, an HLR or HSS, an IP-SM-GW, and an S-CSCF, thereby solving the problem that a calling terminal cannot send a short message to a called terminal that does not have an MSISDN, and implementing short message communications between a terminal and a terminal that does not have an MSISDN.

An embodiment of the present invention provides another short message processing system, which includes a calling terminal, an MSC or SGSN, an S-CSCF, and a called terminal.

The calling terminal is configured to send an SMS-submit message to the MSC or SGSN, where the SMS-submit message carries an indication that the called terminal does not have an MSISDN, the SMS-submit message carries an SIP URI of the called terminal, and the SIP URI is an IMPU of the called terminal.

The MSC or SGSN is configured to receive the SMS-submit message sent by the calling terminal, acquire the SIP URI of the called terminal from the SMS-submit message according to the indication carried in the SMS-submit message, and convert the SMS-submit message into an SIP Message, where a request uniform resource identifier of the SIP Message is the SIP URI of the called terminal, and send the SIP Message to the S-CSCF.

The S-CSCF is configured to receive the SIP Message sent by the MSC or SGSN, and forward the SIP Message to the called terminal.

The called terminal is configured to receive the SIP Message forwarded by the S-CSCF.

Figure 15:
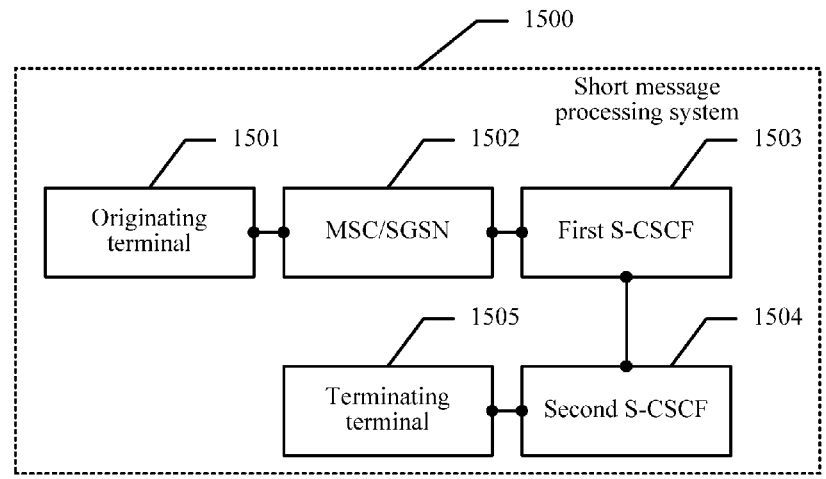
FIG. 15 is a schematic diagram of an embodiment of a short message processing system according to an embodiment of the present invention.

A short message processing system provided in an embodiment of the present invention is introduced in the following. Referring to FIG. 15, the short message processing system 1500 includes a calling terminal 1501, an MSC or SGSN 1502, a first S-CSCF 1503, a second S-CSCF 1504, and a called terminal 1505.

The calling terminal 1501 is configured to send an SMS-submit message to an MSC or SGSN 1502, where the SMS-submit message carries an indication that the called terminal 1505 does not have an MSISDN, and the SMS-submit message carries an IMPU of the called terminal 1505 in the form of an SIP URI.

The MSC or SGSN 1502 is configured to receive the SMS-submit message sent by the calling terminal 1501, acquire the SIP URI of the called terminal 1505 from the SMS-submit message according to the indication carried in the SMS-submit message, and convert the SMS-submit message into an SIP Message, where a request uniform resource identifier of the SIP Message is the SIP URI of the called terminal.

The MSC or SGSN 1502 is configured to send the SIP Message to the first S-CSCF 1503, where the first S-CSCF 1503 is a session initiation protocol server to which the calling terminal is homing.

The first S-CSCF 1503 is configured to receive the SIP Message sent by the MSC or SGSN 1502, and send the SIP Message to the second S-CSCF 1504, where the second S-CSCF 1504 is a session initiation protocol server to which the called terminal is homing.

The second S-CSCF 1504 is configured to receive the SIP Message sent by the first S-CSCF 1503, and forward the SIP Message to the called terminal 1505.

The called terminal 1505 is configured to receive the SIP Message forwarded by the second S-CSCF 1504.

It should be noted that, the called terminal 1505 is further configured to, when the called terminal has received the SIP Message successfully, send an SIP 200 OK message to the second S-CSCF 1504.

The second S-CSCF 1504 is further configured to receive the SIP 200 OK message sent by the called terminal 1505, and forward the SIP 200 OK message to the first S-CSCF 1503.

The first S-CSCF 1503 is further configured to receive the SIP 200 OK message forwarded by the second S-CSCF 1504, and forward the SIP 200 OK message to the MSC or SGSN 1502.

The MSC or SGSN 1502 is further configured to receive the SIP 200 OK message forwarded by the first S-CSCF.

It should be noted that, content such as information exchange and execution processes of the modules/units of the foregoing device is according to a same concept as that of the method embodiments of the present invention, and therefore brings a same technical effect as that of the method embodiments of the present invention, and for specific content, reference may be made to the illustration of the method embodiment in FIG. 7 of the present invention, which is not described in detail herein.

In the embodiment provided by the present invention, an SMS-submit message sent by a calling terminal to an MSC or SGSN carries an indication that a called terminal does not have an MSISDN, the SMS-submit message carries an IMPU of the called terminal in the form of an SIP URI, so that the calling terminal is capable of sending the indication and the SIP URI of the called terminal to the first S-CSCF via the MSC or SGSN, and a first S-CSCF implements short message communications with the called terminal via a second S-CSCF, thereby solving the problem that a calling terminal cannot send a short message to a called terminal that does not have an MSISDN, and implementing short message communications between a terminal and a terminal that does not have an MSISDN.

Another short message processing system in the embodiment of the present invention includes a calling terminal, an IWF, an SMS-SC, an SMS-GMSC, HLR or HSS, an IP-SM-GW, and a called terminal.

The calling terminal is configured to send a short message to the IWF, where the short message carries a non-MSISDN identifier of a called terminal.

The IWF is configured to receive the short message sent by the calling terminal, map the identifier of the called terminal as an IMSI of the called terminal, and send an SMS-submit message to the SMS-SC, where the SMS-submit message carries the IMSI of the called terminal.

The SMS-SC is configured to receive the SMS-submit message sent by the IWF, and send an SMS-deliver message to the SMS-GMSC, where the SMS-deliver message carries the IMSI of the called terminal.

The SMS-GMSC is configured to receive the SMS-deliver message, and send a Forward Short Message to the IP-SM-GW.

The IP-SM-GW is configured to send an SIP Message to the called terminal, where a request uniform resource identifier of the SIP Message is an SIP URI of the called terminal, the SIP URI of the called terminal is obtained by the IP-SM-GW through mapping according to the IMSI of the called terminal, or the SIP URI of the called terminal is obtained by the HLR or HSS through mapping according to the IMSI of the called terminal and sent to the IP-SM-GW.

The called terminal is configured to receive the SIP Message sent by the IP-SM-GW.

Figure 16:
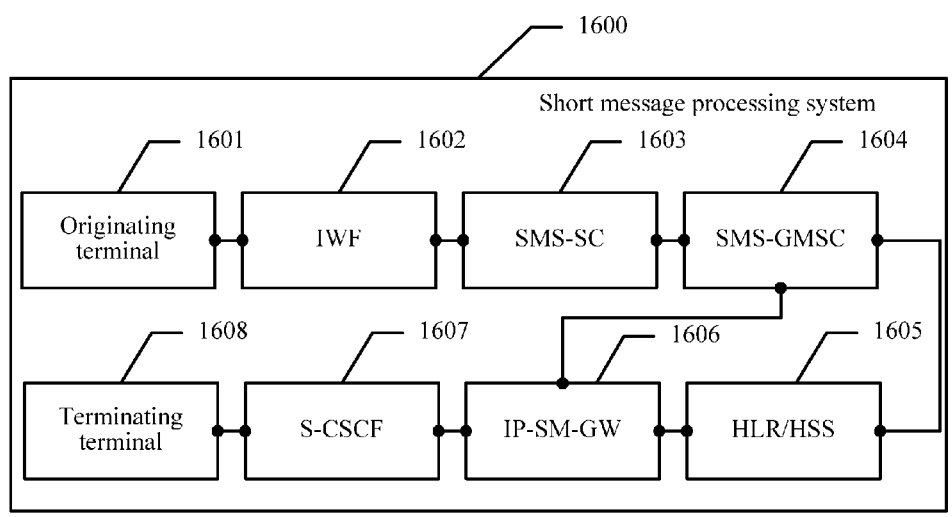
FIG. 16 is a schematic diagram of another embodiment of a short message processing system according to an embodiment of the present invention.

A short message processing system provided in an embodiment of the present invention is introduced in the following. Referring to FIG. 16, the short message processing system 1600 includes a calling terminal 1601, an IWF 1602, an SMS-SC 1603, an SMS-GMSC 1604, an HLR or HSS 1605, an IP-SM-GW 1606, an S-CSCF 1607, and a called terminal 1608.

The calling terminal 1601 is configured to send a short message to the IWF 1602, where the short message carries a non-MSISDN identifier of the called terminal.

The IWF 1602 is configured to receive the short message sent by the calling terminal 1601, map the identifier of the called terminal as an international mobile subscriber identity IMSI of the called terminal, and send an SMS-submit message to the SMS-SC 1603, where the SMS-submit message carries the IMSI of the called terminal.

The SMS-SC 1603 is configured to receive the SMS-submit message sent by the IWF 1602, and send an SMS-deliver message to the SMS-GMSC 1604, where the SMS-deliver message carries the IMSI of the called terminal.

The SMS-GMSC 1604 is configured to receive the SMS-deliver message, and send a first routing information request message to the HLR or HSS 1605, where the first routing information request message carries the IMSI of the called terminal.

The HLR or HSS 1605 is configured to receive the first routing information request message sent by the SMS-GMSC 1604, and forward the first routing information request message to the IP-SM-GW 1606.

The IP-SM-GW 1606 is configured to receive the first routing information request message sent by the HLR or HSS 1605, generate a called correlation identifier, and return the called correlation identifier and an MSISDN of the IP-SM-GW to the SMS-GMSC 1604, where the called correlation identifier is used for correlating a Forward Short Message subsequently sent by the SMS-GMSC and the first routing information request message.

The SMS-GMSC 1604 is configured to receive the called correlation identifier and the MSISDN of the IP-SM-GWIP-SM-GW, and send the Forward Short Message to the IP-SM-GW 1605, where the Forward Short Message carries called correlation identifier.

The IP-SM-GW 1606 is configured to receive the Forward Short Message sent by the SMS-GMSC 1604, and convert the Forward Short Message into an SIP Message, where a request uniform resource identifier of the SIP Message is the SIP URI of the called terminal, the SIP URI of the called terminal is obtained by the IP-SM-GW through mapping according to the IMSI of the called terminal map, or the SIP URI of the called terminal is obtained by the HLR or HSS through mapping according to the IMSI of the called terminal and sent to the IP-SM-GW.

The IP-SM-GW 1606 is configured to send the SIP Message to the S-CSCF 1607.

The S-CSCF 1607 is configured to receive the SIP Message sent by the IP-SM-GW 1606, and forward the SIP Message to the called terminal 1608.

The called terminal 1608 is configured to receive the SIP Message forwarded by the called terminal.

It should be noted that, the short message receiving system 1600 in the embodiment of the present invention further includes an MSC or SGSN (not shown in FIG. 16).

The called terminal 1608 is further configured to, when the called terminal 1608 fails to receive the SIP Message, send a session initiation protocol error message to the S-CSCF 1607.

The S-CSCF 1607 is further configured to receive the session initiation protocol error message sent by the called terminal 1608, and forward the session initiation protocol error message to the IP-SM-GW 1606.

The IP-SM-GW 1606 is further configured to receive the session initiation protocol error message forwarded by the S-CSCF 1607, and send a second routing information request message to the HLR or HSS 1605, where the second routing information request message carries the SIP URI or an IMSI of the called terminal 1608.

The HLR or HSS 1605 is further configured to receive the second routing information request message sent by the IP-SM-GW 1606, and return an MSC address or SGSN address to the IP-SM-GW 1606 according to the SIP URI or IMSI of the called terminal 1608.

The IP-SM-GW 1606 is further configured to receive the MSC address or SGSN address returned by the HLR or HSS 1605, and send an SMS-deliver message to the MSC or SGSN.

The MSC or SGSN is further configured to receive the SMS-deliver message sent by the IP-SM-GW 1606, and forward the SMS-deliver message to the called terminal 1608.

The called terminal 1608 is further configured to receive the SMS-deliver message forwarded by the MSC or SGSN.

It should be noted that, the called terminal 1608 is further configured to, when the called terminal 1608 has received the SIP Message successfully, send an SIP 200 OK message to the S-CSCF 1607.

The S-CSCF 1607 is further configured to receive the SIP 200 OK message sent by the called terminal 1608, and forward the SIP 200 OK message to the IP-SM-GW 1606.

The IP-SM-GW 1606 is further configured to receive the SIP 200 OK message forwarded by the S-CSCF 1607.

Figure 8:
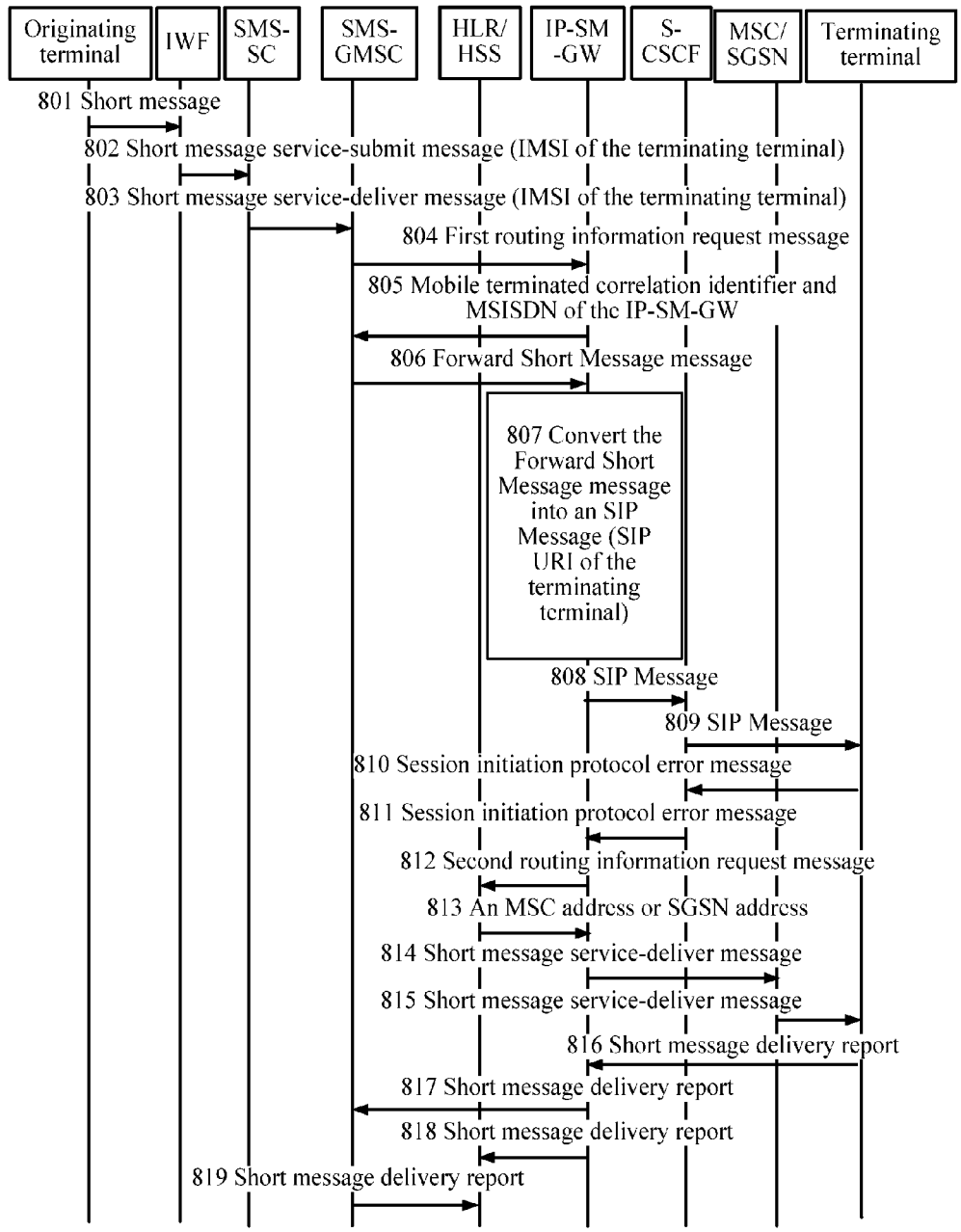
FIG. 8 is a schematic diagram of another embodiment of a short message processing method according to an embodiment of the present invention.

It should be noted that, content such as information exchange and execution processes of the modules/units of the foregoing device is according to a same concept as that of the method embodiments of the present invention, and therefore brings a same technical effect as that of the method embodiments of the present invention, and for specific content, reference may be made to the illustration of the method embodiment in FIG. 8 of the present invention, which is not described in detail herein.

In the embodiment provided by the present invention, a short message sent by a calling terminal to an IWF carries a non-MSISDN identifier of a called terminal, the IWF is capable of mapping the identifier of the called terminal as an IMSI of the called terminal and sending the IMSI of the called terminal to an SMS-SC, and the SMS-SC implements short message communications with the called terminal via an SMS-GMSC, HLR or HSS, IP-SM-GW, and S-CSCF, thereby solving the problem that a calling terminal cannot send a short message to a called terminal that does not have an MSISDN, and implementing short message communications between a terminal and a terminal that does not have an MSISDN.

Persons of ordinary skill in the art may understand that all or a part of the steps of the forgoing embodiments may be implemented by hardware, or may be implemented by a program instructing relevant hardware. The program may be stored in a computer readable storage medium and the storage medium may be a read-only memory, a magnetic disk, an optical disk or the like.

A short message processing method and a relevant system provided in the present invention are described in detail above. Persons of ordinary skill in the art can make variations to the present invention in terms of the specific implementations and application scopes according to the ideas of the embodiments of the present invention. Therefore, the specification shall not be construed as a limit to the present invention.

What is claimed is:

1. A short message processing method, comprising:
 sending, by a calling terminal, a short message service (SMS)-submit message to either a mobile switching center (MSC) or a service general packet radio service support node (SGSN), wherein the SMS-submit message carries a session initiation protocol (SIP) uniform resource identifier (URI) of a called terminal and an indication that the called terminal does not have a mobile station international Public Switched Telephone Network (PSTN)/Integrated Services Digital Network (ISDN) number (MSISDN), wherein the SIP URI is an Internet Protocol (IP) Multimedia Subsystem Public User Identity (IMPU) of the called terminal, wherein the called terminal does not have the MSISDN, wherein the indication is a value that indicates to the MSC or the SGSN that the called terminal does not have the MSISDN, wherein the SMS-submit message is received by either the MSC or the SGSN, and wherein the SMS-submit message is then sent to an SMS-service center (SMS-SC) via an SMS-interworking mobile switching center (SMS-IWMSC);

sending, by the SMS-SC, to an SMS-gateway mobile switching center (SMS-GMSC), an SMS-deliver message and the indication that the called terminal does not have an MSISDN, wherein the SMS-deliver message carries the SIP URI of the called terminal;

sending, by the SMS-GMSC, the indication and a Forward Short Message to an Internet protocol-short message-gateway (IP-SM-GW), wherein the Forward Short Message carries the SIP URI of the called terminal;

acquiring, by the IP-SM-GW, the SIP URI of the called terminal from the Forward Short Message according to the indication; and sending, by the IP-SM-GW, an SIP Message to the called terminal, wherein a request URI of the SIP Message is the SIP URI of the called terminal.

2. The short message processing method according to claim 1, wherein the SMS-submit message carries the SIP URI of the called terminal and the indication that the called terminal does not have the MSISDN comprises a preset newly-defined field in the SMS-submit message carries the indication that the called terminal does not have an MSISDN, wherein either the transfer layer protocol user data field header or the transfer layer protocol user data field short message of the SMS-submit message carries the SIP URI of the called terminal.

3. The short message processing method according to claim 1, wherein the sending, by the SMS-GMSC, the indication and the Forward Short Message to the IP-SM-GW comprises:

sending, by the SMS-GMSC, a first routing information request message to either a home location register (HLR) or a home subscriber server (HSS), wherein the first routing information request message carries the indication that the called terminal does not have an MSISDN;

forwarding, by the HLR or HSS, the first routing information request message to the IP-SM-GW;

generating, by the IP-SM-GW, a called correlation identifier;

returning the called correlation identifier and an MSISDN of the IP-SM-GW to the SMS-GMSC, wherein the called correlation identifier is used for correlating the Forward Short Message subsequently sent by the SMS-GMSC and the first routing information request message; and sending, by the SMS-GMSC, the Forward Short Message to the IP-SM-GW, wherein the Forward Short Message carries the SIP URI of the called terminal and the called correlation identifier.

4. The short message processing method according to claim 1, wherein the SMS-submit message carries the SIP URI of the called terminal and the indication that the called terminal does not have the MSISDN comprises a transfer layer protocol-protocol identifier (TP-PID) field of the SMS-submit message carries the indication that the called terminal does not have the MSISDN, wherein either a transfer layer protocol user data field header or a transfer layer protocol user data field short message of the SMS-submit message carries the SIP URI of the called terminal.

5. The short message processing method according to claim 1, wherein the sending, by the SMS-SC to the SMS-GMSC, the SMS-deliver message and the indication that the called terminal does not have the MSISDN comprises:

sending, by the SMS-SC, a relay layer protocol-mobile terminated-data (RP-MT-DATA) message to the SMS-GMSC, wherein the SMS-deliver message is encapsulated in the RP-MT-DATA message, and wherein a relay layer protocol-destination-address (RP-DA) field or a preset newly-defined field of the RP-MT-DATA message carries the indication that the called terminal does not have the MSISDN.

6. The short message processing method according to claim 1, wherein the SMS-deliver message carrying the SIP URI of the called terminal comprises a transfer layer protocol user data field header of the SMS-deliver message carrying the SIP URI of the called terminal.

7. The short message processing method according to claim 3, wherein the first routing information request message comprises:

an MSISDN field that carries the indication that the called terminal does not have an MSISDN; or a preset newly-defined field in the first routing information request message carries the indication that the called terminal does not have an MSISDN.

8. The short message processing method according to claim 1, wherein the acquiring, by the IP-SM-GW, the SIP URI of the called terminal from the Forward Short Message comprises acquiring, by the IP-SM-GW, the SIP URI of the called terminal from either a transfer layer protocol user data field header or a transfer layer protocol user data field short message of the Forward Short Message.

9. The short message processing method according to claim 1, wherein after the sending, by the IP-SM-GW, the SIP Message to the called terminal comprises:

sending, by the IP-SM-GW, a second routing information request message to either the HLR or the HSS when the called terminal fails to receive the SIP Message, wherein the second routing information request message carries the SIP URI or an international mobile subscriber identity (IMSI) of the called terminal;

receiving, by the IP-SM-GW, either an MSC address or an SGSN address of the called terminal that is returned by either the HLR or HSS according to either the SIP URI or IMSI of the called terminal; and sending, by the IP-SM-GW, the SMS-deliver message to the called terminal through the MSC or SGSN.

10. A short message processing method, comprising:

sending, by a calling terminal, a short message service (SMS)-submit message to either a mobile switching center (MSC) or a service general packet radio service support node (SGSN), wherein the SMS-submit message carries a mobile station international Public Switched Telephone Network (PSTN)/Integrated Services Digital Network (ISDN) number (MSISDN) of a short message specific service server and a session initiation protocol (SIP) uniform resource identifier (URI) of a called terminal that does not have an MSISDN to establish short message communication between the calling terming and the called terminal that does not have the MSISDN, wherein the SIP URI is an Internet Protocol (IP) Multimedia Subsystem Public User Identity (IMPU) of the called terminal, and the SMS-submit message is received by either the MSC or the SGSN, and wherein the SMS-submit message is then sent to an SMS-service center (SMS-SC) via an SMS-interworking mobile switching center (SMS-IWMSC);

sending, by the SMS-SC, an SMS-deliver message and the MSISDN to an SMS-gateway mobile switching center (SMS-GMSC), wherein the SMS-deliver message carries the SIP URI of the called terminal;

sending, by the SMS-GMSC, a Forward Short Message to the short message specific service server according to the MSISDN, wherein the Forward Short Message carries the SIP URI of the called terminal;

acquiring, by the short message specific service server, the SIP URI of the called terminal from the Forward Short; and sending, by the short message specific service server, an SIP Message to the called terminal, wherein a request URI of the SIP Message is the SIP URI of the called terminal.

11. The short message processing method according to claim 10, wherein the sending, by the SMS-GMSC, a Forward Short Message to the short message specific service server according to the MSISDN comprises:

sending, by the SMS-GMSC, a first routing information request message to either a home location register (HLR) or a home subscriber server (HSS), wherein the first routing information request message carries the MSISDN;

forwarding, by the HLR or HSS, the first routing information request message to the short message specific service server;

generating, by the short message specific service server, a called correlation identifier;

returning the called correlation identifier and the MSISDN to the SMS-GMSC, wherein the called correlation identifier is used for correlating the Forward Short Message subsequently sent by the SMS-GMSC and the first routing information request message; and sending, by the SMS-GMSC, the Forward Short Message to the short message specific service server, wherein the Forward Short Message carries the SIP URI of the called terminal and the called correlation identifier.

12. The short message processing method according to claim 10, wherein that the SMS-submit message carries the MSISDN of the short message specific service server and the SIP URI of the called terminal comprises a transfer layer protocol-destination-address (TP-DA) field of the SMS-submit message carries the MSISDN of the short message specific service server, wherein either a transfer layer protocol user data field header or a transfer layer protocol user data field short message of the SMS-submit message carries the SIP URI of the called terminal.

13. The short message processing method according to claim 10, wherein the sending, by the SMS-SC, the SMS-deliver message and the MSISDN to the SMS-GMSC comprises: sending, by the SMS-SC, a relay layer protocol-mobile terminated-data (RP-MT-DATA) message to the SMS-GMSC, wherein the SMS-deliver message is encapsulated in the RP-MT-DATA message, and wherein a relay layer protocol-destination-address (RP-DA) field of the RP-MT-DATA message carries the MSISDN.

14. The short message processing method according to claim 10, wherein that the SMS-deliver message carries the SIP URI of the called terminal comprises a transfer layer protocol user data field short message of the SMS-deliver message carries the SIP URI of the called terminal.

15. The short message processing method according to claim 10, wherein the first routing information request message carrying the MSISDN of the short message specific service server comprises an MSISDN field of the first routing information request message carrying the MSISDN of the short message specific service server.

16. The short message processing method according to claim 10, wherein after the sending, by the short message specific service server, the SIP Message to the called terminal, comprises sending, by the short message specific service server, a second routing information request message to either the HLR or the HSS when the called terminal fails to receive the SIP Message, wherein the second routing information request message carries the SIP URI or an international mobile subscriber identity (IMSI) of the called terminal;

receiving, by the short message specific service server, either an MSC address or an SGSN address of the called terminal that is returned by either the HLR or the HSS according to either the SIP URI or the IMSI of the called terminal; and sending, by the short message specific service server, the SMS-deliver message to the called terminal through an MSC corresponding to either the MSC address or an SGSN corresponding to the SGSN address.

17. A short message processing method, comprising:

sending, by a calling terminal, a short message to an inter-working function entity (IWF), wherein the short message carries a non-mobile station international Public Switched Telephone Network (PSTN)/Integrated Services Digital Network (ISDN) number (MSISDN) identifier of a called terminal that does not have an MSISDN to establish short message communication between the calling terming and the called terminal that does not have the MSISDN;

mapping, by the IWF, the identifier of the called terminal as an international mobile subscriber identity (IMSI) of the called terminal, and sending a short message service (SMS)-submit message to an SMS-service center (SMS-SC), wherein the SMS-submit message carries the IMSI of the called terminal;

sending, by the SMS-SC, an SMS-deliver message to an SMS-gateway mobile switching center (SMS-GMSC), wherein the SMS-deliver message carries the IMSI of the called terminal;

sending, by the SMS-GMSC, a Forward Short Message to an Internet protocol (IP)-short message-gateway IP-SM-GW; and sending, by the IP-SM-GW, a session initiation protocol (SIP) Message to the called terminal, wherein a request uniform resource identifier (URI) Request of the SIP Message is the SIP URI of the called terminal, wherein either the SIP URI of the called terminal is obtained by the IP-SM-GW through mapping according to the IMSI of the called terminal, or the SIP URI of the called terminal is obtained by a home location register (HLR) or a home subscriber server (HSS) through mapping according to the IMSI of the called terminal and sent to the IP-SM-GW.

18. The short message processing method according to claim 17, wherein the sending, by the SMS-GMSC, a Forward Short Message to an IP-SM-GW comprises:

sending, by the SMS-GMSC, a first routing information request message to the HLR or the HSS, wherein the first routing information request message carries the IMSI of the called terminal;

forwarding, by either the HLR or the HSS, the first routing information request message to the IP-SM-GW;

generating, by the IP-SM-GW, a called correlation identifier;

returning the called correlation identifier and an MSISDN of the IP-SM-GW to the SMS-GMSC, wherein the called correlation identifier is used for correlating the Forward Short Message subsequently sent by the SMS-GMSC and the first routing information request message; and sending, by the SMS-GMSC, the Forward Short Message to the IP-SM-GW, wherein the Forward Short Message carries the called correlation identifier.

19. The short message processing method according to claim 17, wherein that the SMS-submit message carries the IMSI of the called terminal comprises:

that a transfer layer protocol-destination-address (TP-DA) field of the SMS-submit message carries the IMSI of the called terminal.

20. The short message processing method according to claim 17, wherein that the SMS-deliver message carries the IMSI of the called terminal comprises:

that the SMS-deliver message is encapsulated in a relay layer protocol-mobile terminated-data (RP-MT-DATA) message, and a relay layer protocol-destination-address (RP-DA) field of the RP-MT-DATA message carries the IMSI of the called terminal.

21. The short message processing method according to claim 17, wherein after the sending, by the IP-SM-GW, the SIP Message to the called terminal, further comprises:

sending, by the IP-SM-GW, a second routing information request message to either the HLR or the HSS when the called terminal fails to receive the SIP Message, wherein the second routing information request message either carries the SIP URI or an IMSI of the called terminal;

receiving, by the IP-SM-GW, an MSC address or SGSN address of the called terminal that is returned by either the HLR or the HSS according to the SIP URI or the IMSI of the called terminal; and sending, by the IP-SM-GW, the SMS-deliver message to the called terminal through an MSC corresponding to the MSC address or an SGSN corresponding to the SGSN address.

* * * * *

UNITED STATES PATENT AND TRADEMARK OFFICE
CERTIFICATE OF CORRECTION

PATENT NO.       : 9,497,605 B2                                  Page 1 of 1
APPLICATION NO.  : 14/143441
DATED            : November 15, 2016
INVENTOR(S)      : Xiaoyan Duan It is certified that error appears in the above-identified patent and that said Letters Patent is hereby corrected as shown below:

In the Claims

Column 47, Line 10, Claim 10 should read:
A short message processing method, comprising:
sending, by a calling terminal, a short message service (SMS)-submit message to either a mobile switching center (MSC) or a service general packet radio service support node (SGSN), wherein the SMS-submit message carries a mobile station international Public Switched Telephone Network (PSTN)/Integrated Services Digital Network (ISDN) number (MSISDN) of a short massage specific service server and a session initiation protocol (SIP) uniform resource identifier (URI) of a called terminal that does not have an MSISDN to establish short message communication between the calling terming and the called terminal that does not have the MSISDN, wherein the SIP URI is an Internet Protocol (IP) Multimedia Subsystem Public User identity (IMPU) of the called terminal, and the SMS-submit message is received by either the MSC or the SGSN, and wherein the SMS-submit message is then sent to an SMS-service center (SMS-SC) via an SMS-interworking mobile switching center (SMS-IWMSC);
sending, by the SMS-SC, an SMS-deliver message and the MSISDN to an SMS-gateway mobile switching center (SMS-GMSC), wherein the SMS-deliver message carries the SIP URI of the called terminal;
sending, by the SMS-GMSC, a Forward Short Message to the short message specific service server according to the MSISDN, wherein the Forward Short Message carries the SIP URI of the called terminal;
acquiring, by the short message specific service server, the SIP URI of the called terminal from the Forward Short Message; and
sending, by the short message specific service server, an SIP Message to the called terminal, wherein a request URI of the SIP Message is the SIP URI of the called terminal.

Signed and Sealed this
Twenty-first Day of February, 2017

Michelle K. Lee
*Director of the United States Patent and Trademark Office*